United States Patent
Sugaya et al.

(10) Patent No.: US 6,292,289 B1
(45) Date of Patent: Sep. 18, 2001

(54) METHOD, DEVICE, AND SYSTEM FOR TRANSMITTING A SUPERVISORY OPTICAL SIGNAL

(75) Inventors: Yasushi Sugaya; Terumi Chikama, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/492,458

(22) Filed: Jan. 27, 2000

(30) Foreign Application Priority Data

Mar. 18, 1999 (JP) .................................................. 11-074336

(51) Int. Cl.[7] ....................................................... H01S 3/00
(52) U.S. Cl. ............................................. 359/337; 359/177
(58) Field of Search ..................................... 359/341, 337, 359/177

(56) References Cited

U.S. PATENT DOCUMENTS

| | | | |
|---|---|---|---|
| 5,914,794 | * 6/1999 | Fee et al. ............................. | 359/110 |
| 5,966,237 | * 10/1999 | Sugaya et al ......................... | 359/341 |
| 6,023,366 | * 2/2000 | Kinoshita ............................. | 359/341 |
| 6,151,148 | * 11/2000 | Harano ................................. | 359/174 |

FOREIGN PATENT DOCUMENTS 3-214936   9/1991   (JP) .
5-284114  10/1993   (JP) .

* cited by examiner

*Primary Examiner*—Mark Hellner
(74) *Attorney, Agent, or Firm*—Staas & Halsey, LLP

(57) ABSTRACT

The present invention relates to a method for transmitting a supervisory optical signal. A first optical amplifier for a first band (e.g., a conventional band: C band) determining a noise characteristic and a gain efficiency is provided. A second optical amplifier for a second band (e.g., a long wavelength band: L band) determining a noise characteristic and a gain efficiency is provided. The supervisory optical signal is processed in relation to one of the first and second optical amplifiers superior in at least one of the noise characteristic and the gain efficiency to the other. According to this method, undue degradation in the noise characteristic and the gain efficiency can be prevented to maintain a good transmission quality of a main signal.

35 Claims, 14 Drawing Sheets

EDFA : Erbium-Doped Fiber Amplifier(1530-1570nm)
GS-EDFA : Gain-Shifted EDFA(1570-1610nm)
EDTFA : Tellurite-Based EDFA(1530-1610nm)
TDFA : Thulium-Doped Fluoride-Based Fiber Amplifier(1450-1490nm)
RFA : Raman Fiber Amplifier(1450-1650nm or more)

METHOD, DEVICE, AND SYSTEM FOR TRANSMITTING A SUPERVISORY OPTICAL SIGNAL

BACKGROUND OF THE INVENTION

1. Field of the Invention

The present invention relates to a method, device, and system for transmitting a supervisory optical signal.

2. Description of the Related Art

In recent years, information demand has rapidly increased in concert with the development in multimedia network, and an arterial optical transmission system integrating an information capacity is demanded to further increase a transmission capacity and form a flexible network. At present, wavelength division multiplexing (WDM) is the most effective technique responding to such a system demand, and the commercialization of WDM is now being pursued actively mainly in North America. A method of supervising a system adopting WDM is an indispensable function in operating the system. The present invention provides such a supervising method and its associated device suitable for a system adopting WDM.

In recent years, a manufacturing technique and using technique for a low-loss (e.g., 0.2 dB/km) silica optical fiber have been established, and an optical communication system using the optical fiber as a transmission line has been put into practical use. Further, to compensate for losses in the optical fiber and thereby allow long-haul transmission, an optical amplifier for amplifying an optical signal or signal light has been put to practical use.

An optical amplifier known in the art includes an optical amplifying medium to which signal light to be amplified is supplied and a pumping unit for pumping (exciting) the optical amplifying medium so that the optical amplifying medium provides a gain band including the wavelength of the signal light.

For example, an erbium doped fiber amplifier (EDFA) has been developed to amplify signal light having a wavelength band of 1.55 $\mu$m where the loss in a silica fiber is minimum. The EDFA includes an erbium doped fiber (EDF) as the optical amplifying medium and a pumping source for supplying pump light having a predetermined wavelength to the EDF. By preliminarily setting the wavelength of the pump light within a 0.98 $\mu$m band or a 1.48 $\mu$m band, a gain band including a wavelength band of 1.55 $\mu$m can be obtained.

Further, another type optical amplifier having a semiconductor chip as the optical amplifying medium is also known. In this case, the pumping is performed by injecting an electric current into the semiconductor chip.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain main signal light (WDM signal light), which is output to an optical fiber transmission line. At a receiving end, the main signal light received is separated into individual optical signals by an optical demultiplexer, and transmitted data (a main signal) is reproduced according to each optical signal. Accordingly, by applying WDM, the transmission capacity by a single optical fiber can be increased according to the number of WDM channels.

In the case of incorporating an optical amplifier into a system adopting WDM, a transmission distance is limited by the wavelength characteristic of gain of the optical amplifier which characteristic is represented by a gain deviation or gain tilt. For example, in a typical EDFA, it is known that a gain deviation is produced at wavelengths near 1.55 $\mu$m. If the gain deviations in a plurality of cascaded EDFAs are accumulated, an optical SNR (signal-to-noise ratio) in a channel included in a low-gain band is degraded. Accordingly, to allow high-quality transmission, it is preferable to flatten the wavelength characteristic of gain of an optical amplifier.

On the other hand, to increase the number of WDM channels, it is effective to broaden the bandwidth of a gain band (a band where gain is generated) of an optical amplifier. For the purpose of such bandwidth broadening, there has been proposed a device including two optical amplifiers arranged in parallel, wherein one of the two optical amplifiers amplifies optical signals having wavelengths in a shorter-wavelength band and the other optical amplifier amplifies optical signals having wavelengths in a longer-wavelength band.

In any case, one optical amplifier or two optical amplifiers connected in parallel is/are provided in an optical repeater, and a plurality of such optical repeaters are arranged along an optical fiber transmission line.

To perform supervisory control of each optical repeater and the other system components, a supervisory optical signal is transmitted. For example, a supervisory optical signal for providing information on the number of WDM channels in operation is transmitted from a transmitting end to each optical repeater. In each optical repeater, a reference level to be used in ALC (automatic output level control) for maintaining an output level per channel constant is set according to the supervisory optical signal received. Some conventional methods for transmitting a supervisory optical signal will now be described with reference to FIGS. 1 to 3.

FIG. 1 is a block diagram of a conventional system for transmitting a supervisory optical signal. This system includes a first terminal device 2 as a transmitting end, a second terminal device 4 as a receiving end, an optical fiber transmission line 6 placed between the terminal devices 2 and 4, and a plurality of optical repeaters 8 arranged along the optical fiber transmission line 6.

The terminal device 2 includes an optical transmitter (TX) 10 for outputting an optical signal of one channel or WDM signal light obtained by wavelength division multiplexing a plurality of optical signals having different wavelengths as main signal light, and an optical supervisory circuit (OSC) 12 for outputting a supervisory optical signal. It is now assumed that the optical transmitter 10 outputs main signal light obtained by WDM in a conventional band (referred to as "1.55 $\mu$m band" or "C band") defined by the range of 1.53 to 1.56 $\mu$m, provided that WDM is applied to this system. The main signal light output from the optical transmitter 10 and the supervisory optical signal output from the optical supervisory circuit 12 are multiplexed by a wavelength coupler 14 and then supplied to the optical fiber transmission line 6.

Each optical repeater 8 includes an optical amplifier 16 for amplifying the main signal light. The main signal light and the supervisory optical signal transmitted by the optical fiber transmission line 6 are separated from each other by a wavelength coupler 18. The main signal light from the wavelength coupler 18 is supplied to the optical amplifier 16, and the supervisory optical signal from the wavelength coupler 18 is supplied to an optical supervisory circuit 20. The optical supervisory circuit 20 regenerates a supervisory signal as an electrical signal according to the supervisory optical signal received to perform processing based on the supervisory signal and update the supervisory signal. The supervisory signal updated is converted into a supervisory optical signal, which is in turn supplied to a wavelength coupler 22. In the wavelength coupler 22, the supervisory optical signal updated by the optical supervisory circuit 20 and the main signal light amplified by the optical amplifier 16 are multiplexed to be output to the optical fiber transmission line 6. The processing based on the supervisory signal to be performed in the optical supervisory circuit 20 includes setting of a reference level to be used in ALC in the optical amplifier 16 according to the supervisory signal or updating the supervisory signal according to a monitored value of the gain of the optical amplifier 16, for example.

The second terminal device 4 includes a wavelength coupler 24 for demultiplexing the main signal light and the supervisory optical signal transmitted by the optical fiber transmission line 6, an optical receiver (RX) 26 for receiving the main signal light from the wavelength coupler 24, and an optical supervisory circuit 28 for receiving the supervisory optical signal from the wavelength coupler 24.

In the system shown in FIG. 1, the optical supervisory circuit 20 is arranged in parallel to the optical amplifier 16 in each optical repeater 8. Accordingly, the supervisory optical signal is sequentially updated as required and transmitted toward the receiving end.

FIG. 2 is a block diagram of a system that may be proposed from the prior art shown in FIG. 1 for the purpose of bandwidth broadening. In this system, the optical transmitter 10 outputs first main signal light obtained by WDM in the C band and second main signal light obtained by WDM in a long wavelength band (referred to as "1.58 $\mu$m band" or "L band") defined by the range of 1.57 to 1.60 $\mu$m. The first and second main signal lights output from the optical transmitter 10 and the supervisory optical signal output from the optical supervisory circuit 12 are multiplexed by the wavelength coupler 14 and then output to the optical fiber transmission line 6.

Each optical repeater 8 includes an optical amplifier 16(#1) for the first main signal light and an optical amplifier 16(#2) for the second main signal light. The two optical amplifiers 16(#1) and 16(#2) are arranged in parallel. To connect the two optical amplifiers 16(#1) and 16(#2) in parallel, each optical repeater 8 further includes an optical demultiplexer 30 for demultiplexing the first and second main signal lights to respectively supply the first and second main signal lights to the optical amplifiers 16(#1) and 16(#2), and an optical multiplexer 32 for multiplexing the first and second main signal lights respectively amplified by the optical amplifiers 16(#1) and 16(#2). The wavelength couplers 18 and 22 are provided outside of the optical demultiplexer 30 and the optical multiplexer 32, respectively, thereby allowing processing of the supervisory optical signal in the optical supervisory circuit 20.

FIG. 3 is a block diagram of another system that may be proposed from the prior art shown in FIG. 1 for the purpose of bandwidth broadening. In this system, the optical transmitter 10 outputs first main signal light in the C band and second main signal light in the L band as in the system shown in FIG. 2. The optical supervisory circuit 12 outputs first and second supervisory optical signals respectively related to the C band and the L band.

Each optical repeater 8 is similar to that in the system shown in FIG. 2 in the point that it includes optical amplifiers 16(#1) and 16(#2), an optical demultiplexer 30, and an optical multiplexer 32. In each optical repeater 8 shown in FIG. 3, an optical supervisory circuit 20(#1) for the first supervisory optical signal is connected in parallel to the optical amplifier 16(#1), and an optical supervisory circuit 20(#2) for the second supervisory optical signal is connected in parallel to the optical amplifier 16(#2). To configure such parallel connection, wavelength couplers 18(#1) and 22(#1) for the optical amplifier 16(#1) and the optical supervisory circuit 20(#1) are provided so as to interpose the optical amplifier 16(#1), and wavelength couplers 18(#2) and 22(#2) for the optical amplifier 16(#2) and the optical supervisory circuit 20(#2) are provided so as to interpose the optical amplifier 16(#2).

In general, an optical amplifier has its inherent noise characteristic and gain efficiency (gain conversion efficiency: the ratio of output optical power to pumping energy). The noise characteristic and gain efficiency of an optical amplifier are substantially determined by a band to which the optical amplifier is applied. For example, an EDFA for the C band has a noise characteristic and a gain efficiency both superior to those of an EDFA for the L band.

In the system shown in FIG. 2, a loss by the wavelength coupler 18 for branching off the supervisory optical signal in each optical repeater 8 is given uniformly to the optical amplifiers 16(#1) and 16(#2), so that there is a possibility that the noise characteristic and gain efficiency of the optical amplifier 16(#1) or 16(#2) may be unduly degraded. Similarly also in the system shown in FIG. 3, substantially equal losses by the wavelength couplers 18(#1) and 18(#2) are given to the optical amplifiers 16(#1) and 16(#2), respectively, so that there is a possibility of undue degradation in the noise characteristic and gain efficiency of the optical amplifier 16(#1) or 16(#2). In general, a degradation in noise characteristic and gain efficiency of an optical amplifier causes a degradation in transmission quality of a main signal.

SUMMARY OF THE INVENTION

It is therefore an object of the present invention to provide a method, device, and system for transmitting a supervisory optical signal without largely degrading the transmission quality of a main signal. Other objects of the present invention will become apparent from the following description.

In accordance with a first aspect of the present invention, there is provided a method for transmitting a supervisory optical signal. A first optical amplifier for a first band (e.g., the C band) determining a noise characteristic and a gain efficiency is provided. A second optical amplifier for a second band (e.g., the L band) determining a noise characteristic and a gain efficiency is provided. The supervisory optical signal is processed in relation to one of the first and second optical amplifiers superior in at least one of the noise characteristic and the gain efficiency to the other.

According to this method, the supervisory optical signal is processed in relation to one of the first and second optical amplifiers superior in at least one of the noise characteristic and the gain efficiency to the other, so that undue degradation of the noise characteristic and the gain efficiency of the first or second optical amplifier can be prevented, thus achieving one of the objects of the present invention.

Preferably, each of the first and second optical amplifiers comprises a doped fiber doped with a rare earth element, and a pumping source for supplying pump light to the doped fiber. In the case that an EDF doped with Er (erbium) is used as the doped fiber, the length of the EDF of the second optical amplifier may be made longer than the length of the EDF of the first optical amplifier. In this case, the noise characteristic and the gain efficiency of the first optical amplifier become superior to the noise characteristic and the gain efficiency of the second optical amplifier as will be hereinafter described in detail, so that the supervisory optical signal may be processed in relation to the first optical amplifier.

In accordance with a second aspect of the present invention, there is provided a device for transmitting a supervisory optical signal. This device comprises an optical demultiplexer, an optical multiplexer, first and second optical amplifiers, first and second wavelength couplers, and a supervisory circuit. The optical demultiplexer has an input port and first and second output ports. The input port and the first output port are coupled by a first band, and the input port and the second output port are coupled by a second band. The optical multiplexer has first and second input ports and an output port. The first input port and the output port are coupled by the first band, and the second input port and the output port are coupled by the second band. The first optical amplifier is provided between the first output port of the optical demultiplexer and the first input port of the optical multiplexer to perform amplification in the first band. The second optical amplifier is provided between the second output port of the optical demultiplexer and the second input port of the optical multiplexer to perform amplification in the second band. The first wavelength coupler is provided between the first output port of the optical demultiplexer and the first optical amplifier to branch off the supervisory optical signal output from the first output port. The supervisory circuit receives the supervisory optical signal from the first wavelength coupler. The second wavelength coupler is provided between the first optical amplifier and the first input port of the optical multiplexer to supply the supervisory optical signal output from the supervisory circuit to the first input port. At least one of a noise characteristic and a gain efficiency of the first optical amplifier is superior to that of the second optical amplifier. According to the second aspect of the present invention, it is possible to provide a device suitable for carrying out the method according to the first aspect of the present invention.

In accordance with a third aspect of the present invention, there is provided a system for transmitting a supervisory optical signal. This system comprises an optical fiber transmission line and at least one optical repeater arranged along the optical fiber transmission line. The optical fiber transmission line transmits the supervisory optical signal and main signal light obtained by wavelength division multiplexing an optical signal having a wavelength included in a first band and an optical signal having a wavelength included in a second band. The optical repeater comprises a first optical amplifier for the first band, a second optical amplifier for the second band, and a supervisory circuit for processing the supervisory optical signal. The supervisory circuit is provided in parallel to the first optical amplifier. At least one of a noise characteristic and a gain efficiency of the first optical amplifier is superior to that of the second optical amplifier. According to the third aspect of the present invention, it is possible to provide a system suitable for carrying out the method according to the first aspect of the present invention.

In accordance with each of fourth and fifth aspects of the present invention, there is provided a system for transmitting first and second supervisory optical signals. This system comprises an optical fiber transmission line and at least one optical repeater arranged along the optical fiber transmission line. The optical fiber transmission line transmits the first supervisory optical signal and first main signal light having a wavelength included in a first band in a first direction, and transmits the second supervisory optical signal and second main signal light having a wavelength included in a second band in a second direction opposite to the first direction.

In accordance with the fourth aspect of the present invention, the optical repeater comprises a first optical amplifier for amplifying the first main signal light, a second optical amplifier for amplifying the second main signal light, and first and second supervisory circuits for processing the first and second supervisory optical signals, respectively. The first and second supervisory circuits are provided in parallel to the first optical amplifier. At least one of a noise characteristic and a gain efficiency of the first optical amplifier is superior to that of the second optical amplifier.

In accordance with the fifth aspect of the present invention, the optical repeater comprises a first optical amplifier for amplifying the first main signal light, a second optical amplifier for amplifying the second main signal light, first and second supervisory circuits for processing the first and second supervisory optical signals, respectively, first and second optical circulators for connecting the first optical amplifier and the second supervisory circuit in parallel, and third and fourth optical circulators for connecting the second optical amplifier and the first supervisory circuit in parallel.

In accordance with a sixth aspect of the present invention, there is provided a device for transmitting a supervisory optical signal. This device comprises first and second optical circulators, an optical amplifier, and a supervisory circuit. Each of the first and second optical circulators has first, second, and third ports to output light supplied to the first port from the second port and output light supplied to the second port from the third port. The optical amplifier is connected between the third port of the first optical circulator and the first port of the second optical circulator. The supervisory circuit is connected between the first port of the first optical circulator and the third port of the second optical circulator.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
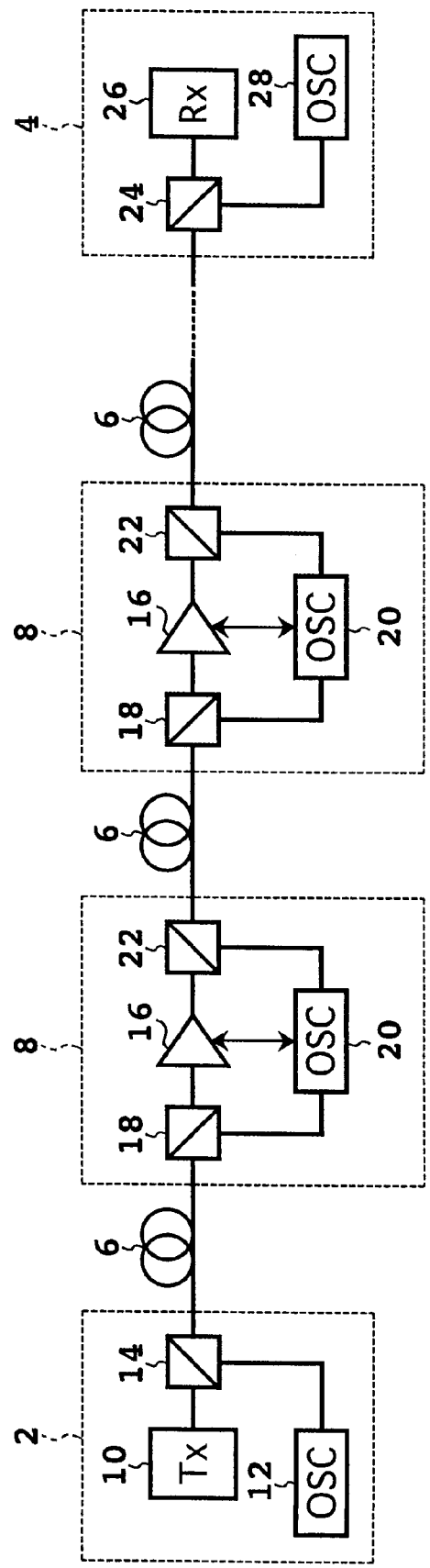
FIG. 1 is a block diagram of a conventional system for transmitting a supervisory optical signal.
Figure 2:
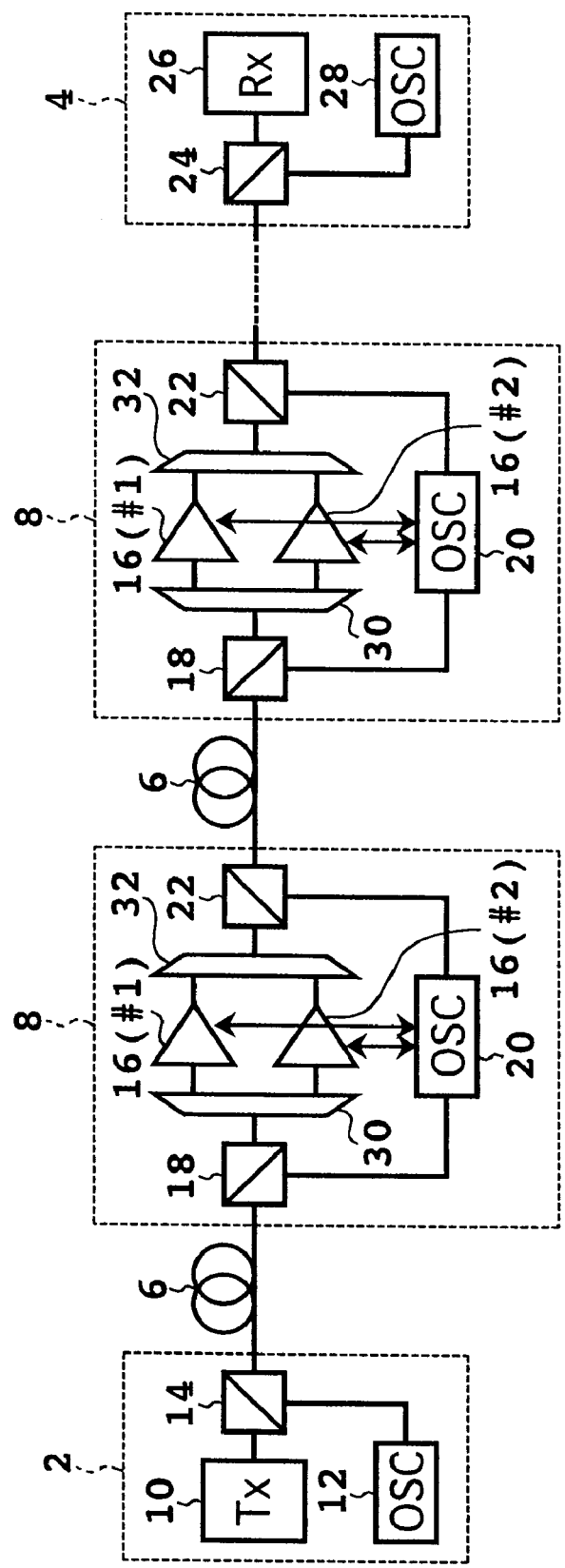
FIG. 2 is a block diagram of a system that may be proposed from the prior art shown in FIG. 1.
Figure 3:
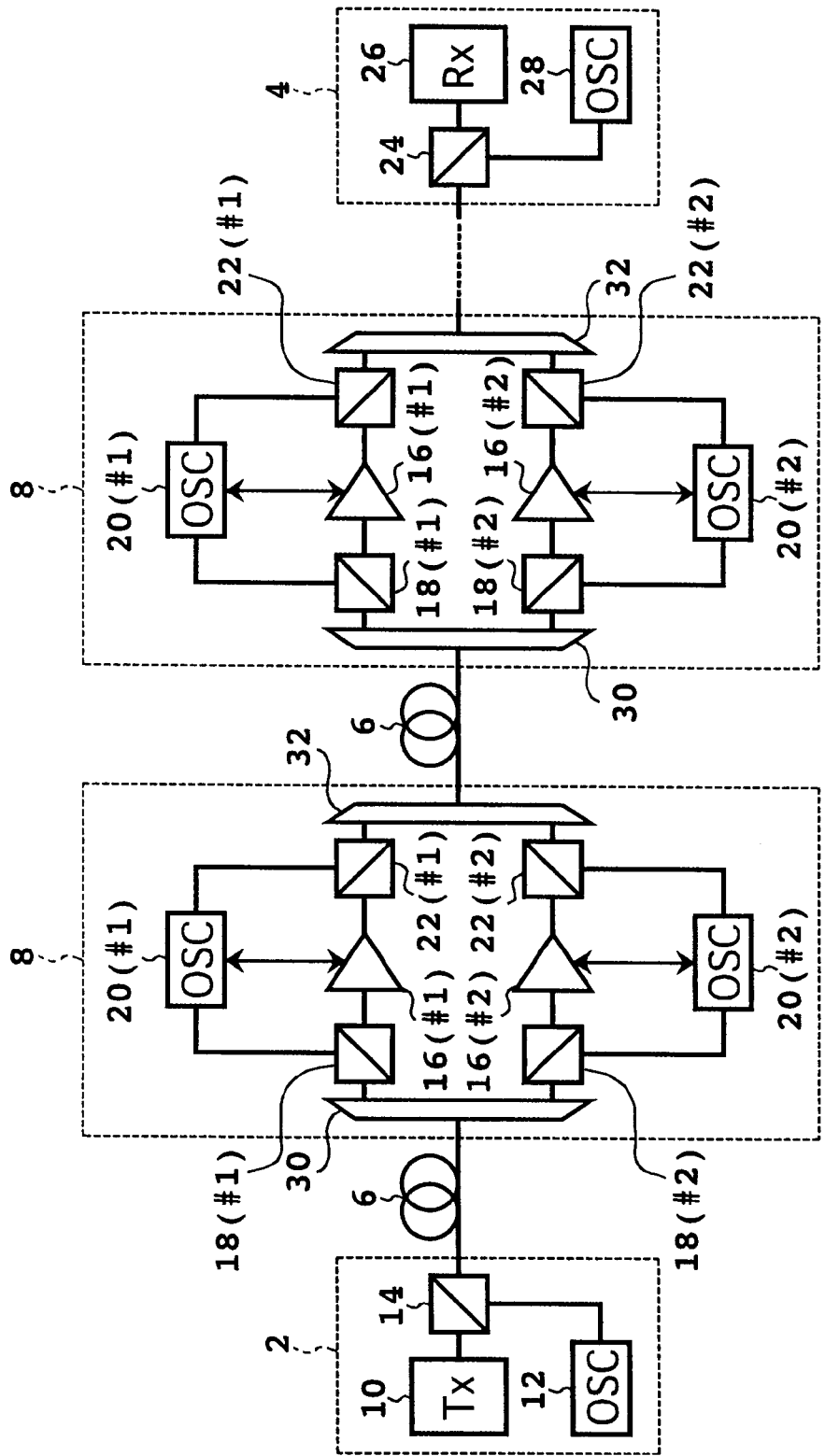
FIG. 3 is a block diagram of another system that may be proposed from the prior art shown in FIG. 1.

Some preferred embodiments of the present invention will now be described in detail. Throughout the drawings, substantially the same parts are denoted by the same reference numerals, and overlapping description thereof may be omitted.

Figure 4:
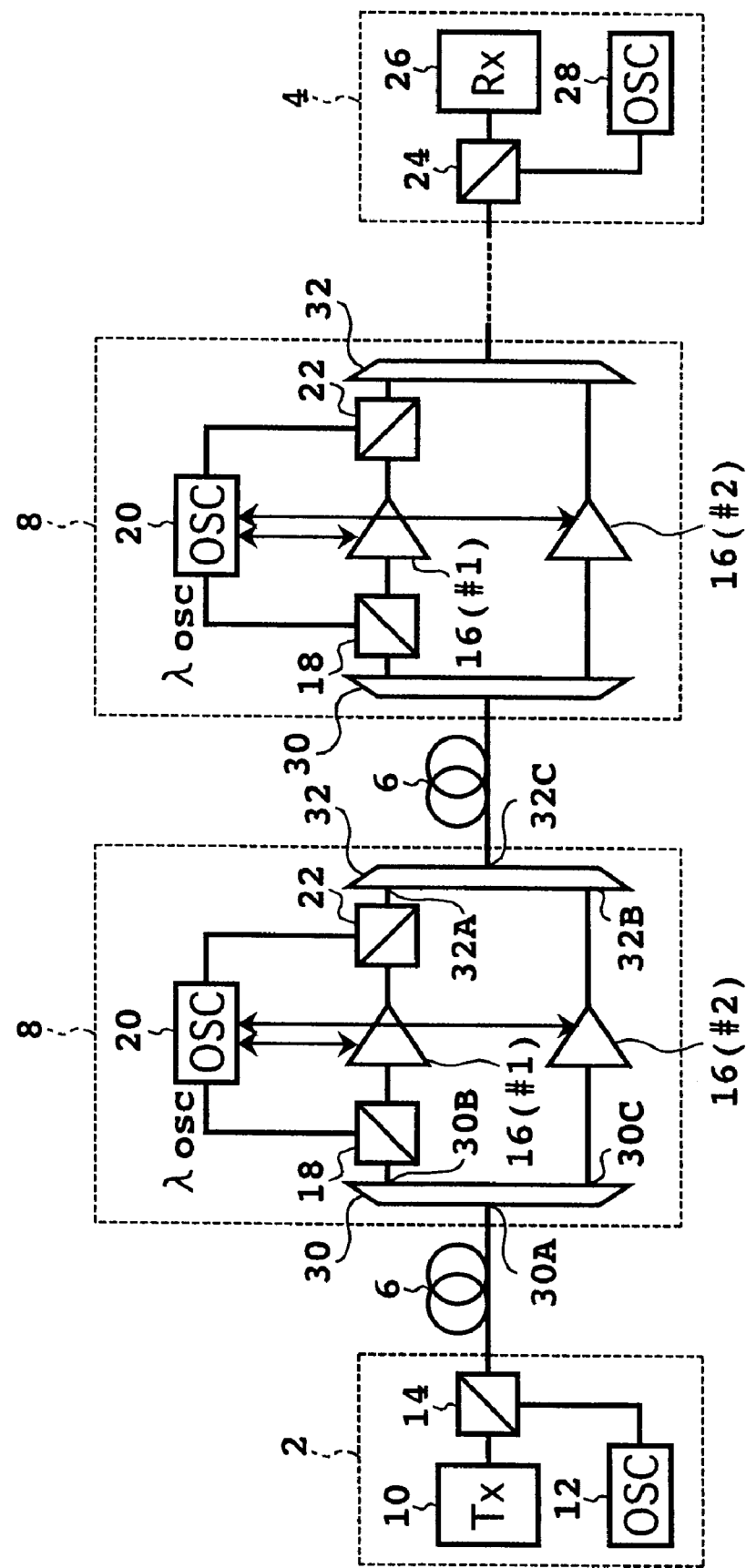
FIG. 4 is a block diagram showing a first preferred embodiment of the system according to the present invention.

FIG. 4 is a block diagram showing a first preferred embodiment of the system according to the present invention for transmitting a supervisory optical signal. A preferred embodiment of the method, device, and system according to the present invention for transmitting a supervisory optical signal will now be described with reference to FIG. 4.

This system includes a first terminal device 2 as a transmitting end, a second terminal device 4 as a receiving end, an optical fiber transmission line 6 placed between the terminal devices 2 and 4, and a plurality of optical repeaters 8 arranged along the optical fiber transmission line 6. The plural optical repeaters 8 may be replaced by a single optical repeater 8 inserted in the optical fiber transmission line 6.

The first terminal device 2 includes an optical transmitter 10, an optical supervisory circuit 12, and a wavelength coupler 14. The optical transmitter 10 outputs WDM signal light as main signal light obtained by wavelength division multiplexing a single or a plurality of optical signals having a single or different wavelengths included in a first band and a single or a plurality of optical signals having a single or different wavelengths included in a second band. The wavelength coupler 14 multiplexes the main signal light output from the optical transmitter 10 and a supervisory optical signal output from the optical supervisory circuit 12 to supply the resultant multiplexed main signal light and supervisory optical signal to the optical fiber transmission line 6.

More specifically, the first band and the second band include the C band and the L band, respectively. In the following description, it is assumed that the first band and the second band coincide with the C band and the L band, respectively, for ease of understanding of the present invention. The supervisory optical signal has a wavelength different from the wavelength of each optical signal of the main signal light. Particularly in this preferred embodiment, the supervisory optical signal has a wavelength shorter than the wavelengths included in the C band. More specifically, the supervisory optical signal has a wavelength included in a 1.51 µm band defined by the range of 1.51 to 1.52 µm.

Each optical repeater 8 includes a first optical amplifier 16(#1) for the C band, a second optical amplifier 16(#2) for the L band, and an optical supervisory circuit 20 for processing the supervisory optical signal. The noise characteristic and gain efficiency of the first optical amplifier 16(#1) are superior to the noise characteristic and gain efficiency of the second optical amplifier 16(#2). Accordingly, the optical supervisory circuit 20 is arranged in parallel to the first optical amplifier 16(#1).

Particularly in this preferred embodiment, an optical demultiplexer 30 and an optical multiplexer 32 are used to connect the optical amplifiers 16(#1) and 16(#2) in parallel, and wavelength couplers 18 and 22 are used to connect the optical amplifier 16(#1) and the optical supervisory circuit 20 in parallel.

The optical demultiplexer 30 has an input port 30A connected to the optical fiber transmission line 6, an output port 30B connected to the wavelength coupler 18, and an output port 30C connected to the optical amplifier 16(#2). The input port 30A and the output port 30B are coupled by the C band and the wavelengths shorter than the C band, and the input port 30A and the output port 30C are coupled by the L band and the wavelengths longer than the L band.

The optical multiplexer 32 has an input port 32A connected to the wavelength coupler 22, an input port 32B connected to the optical amplifier 16(#2), and an output port 32C connected to the optical fiber transmission line 6. The input port 32A and the output port 32C are coupled by the C band and the wavelengths shorter than the C band, and the input port 32B and the output port 32C are coupled by the L band and the wavelengths longer than the L band.

The second terminal device 4 includes a wavelength coupler 24 for demultiplexing the main signal light and the supervisory optical signal transmitted by the optical fiber transmission line 6, an optical receiver 26 for receiving the main signal light from the wavelength coupler 24, and an optical supervisory circuit 28 for receiving the supervisory optical signal from the wavelength coupler 24.

The main signal light and the supervisory optical signal output from the first terminal device 2 are supplied through the optical fiber transmission line 6 to the input port 30A of the optical demultiplexer 30 of the first-stage optical repeater 8. The supervisory optical signal and the main signal light having the C band (which will be hereinafter referred to as C-band main signal light) are supplied from the output port 30B of the optical demultiplexer 30 to the wavelength coupler 18, and the C-band main signal light is passed through the wavelength coupler 18 to be supplied to the first optical amplifier 16(#1). The supervisory optical signal is branched off by the wavelength coupler 18, and then supplied to the optical supervisory circuit 20. The C-band main signal light is amplified by the optical amplifier 16(#1). On the other hand, the main signal light having the L band (which will be hereinafter referred to as L-band main signal light) is supplied from the output port 30C of the optical demultiplexer 30 to the second optical amplifier 16(#2), and then amplified by the optical amplifier 16(#2).

The optical supervisory circuit 20 performs supervisory control of the optical amplifier 16(#1) and/or the optical amplifier 16(#2) according to the input supervisory optical signal. A specific embodiment of the supervisory control is similar to that mentioned above. The optical supervisory circuit 20 updates the supervisory optical signal on the basis of the supervisory control to output an updated supervisory optical signal. The updated supervisory optical signal and the C-band main signal light amplified by the optical amplifier 16(#1) are multiplexed by the wavelength coupler 22, and then supplied to the input port 32A of the optical multiplexer 32. The L-band main signal light amplified by the optical amplifier 16(#2) is supplied to the input port 32B of the optical multiplexer 32. The optical multiplexer 32 performs wavelength division multiplexing of the supervisory optical signal and the C-band main signal light from the wavelength coupler 22 and the L-band main signal light from the optical amplifier 16(#2) to transmit the resultant multiplexed main signal light and supervisory optical signal through the optical fiber transmission line 6 to the second-stage optical repeater 8.

In this manner, the supervisory control in each optical repeater 8 according to the supervisory optical signal is sequentially performed, and the main signal light and the most updated supervisory optical signal are supplied to the second terminal device 4.

In this preferred embodiment, the optical supervisory circuit 20 processes the supervisory optical signal in relation to the first optical amplifier 16(#1) superior in noise characteristic and gain efficiency to the second optical amplifier 16(#2), so that undue degradation of noise characteristic and gain efficiency in each optical repeater 8 can be prevented to thereby ensure a good transmission characteristic of a main signal. More specifically, the wavelength couplers 18 and 22 inducing insertion loss are provided on the input side and the output side of the first optical amplifier 16(#1), respectively, and the second optical amplifier 16(#2) is directly connected between the optical demultiplexer 30 and the optical multiplexer 32. In general, when loss is induced on the input side of an optical amplifier, the noise characteristic is degraded, and when loss is induced on the output side of an optical amplifier, the gain efficiency is degraded. In this preferred embodiment, no wavelength couplers necessary for processing of the supervisory optical signal are provided on the input side and the output side of the second optical amplifier 16(#2) inferior in noise characteristic and gain efficiency to the first optical amplifier 16(#1), so that degradation in noise characteristic and gain efficiency in each optical repeater 8 as a whole can be minimized.

In this preferred embodiment, the wavelength $\lambda_{osc}$ of the supervisory optical signal is set shorter than the wavelengths included in the C band, thereby facilitating wavelength separation of the C-band main signal light and the supervisory optical signal from the L-band main signal light in the optical demultiplexer 30.

Figure 5:
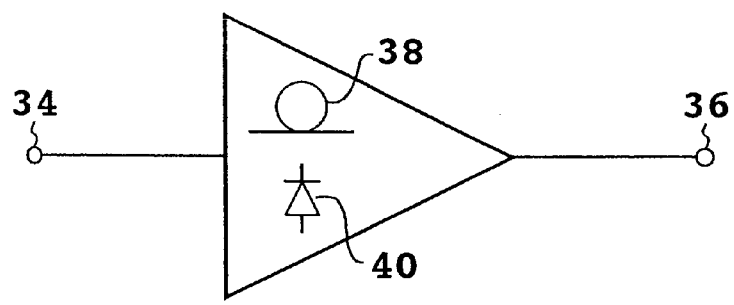
FIG. 5 is a schematic diagram illustrating an EDFA (erbium doped fiber amplifier) applicable to the present invention.

FIG. 5 is a schematic diagram illustrating an EDFA applicable to the present invention. More specifically, the EDFA shown in FIG. 5 may be used as each of the optical amplifiers 16(#1) and 16(#2) shown in FIG. 4. This EDFA includes an input port 34 for inputting main signal light (or an optical signal of one channel), an output port 36 for outputting amplified main signal light, and an EDF 38 to which the main signal light to be amplified is supplied, and a pumping source 40 for supplying pump light to the EDF 38. A typical example of the pumping source 40 is a laser diode oscillating in a 0.98 μm band defined by the range of 0.96 to 1.00 μm or in a 1.48 μm band defined by the range of 1.46 to 1.50 μm. The main signal light and the pump light may propagate in the same direction in the EDF 38, thereby performing forward pumping. As another way, the main signal light and the pump light may propagate in opposite directions in the EDF 38, thereby performing backward pumping. As still another way, such forward pumping and backward pumping may be combined to perform bidirectional pumping.

The EDF 38 of the EDFA adapted to the L band has a length longer than that of the EDF 38 of the EDFA adapted to the C band. As a result, the noise characteristic and gain efficiency of the EDFA adapted to the C band become superior to the noise characteristic and gain efficiency of the EDFA adapted to the L band. This will now be described in detail.

Figure 6:
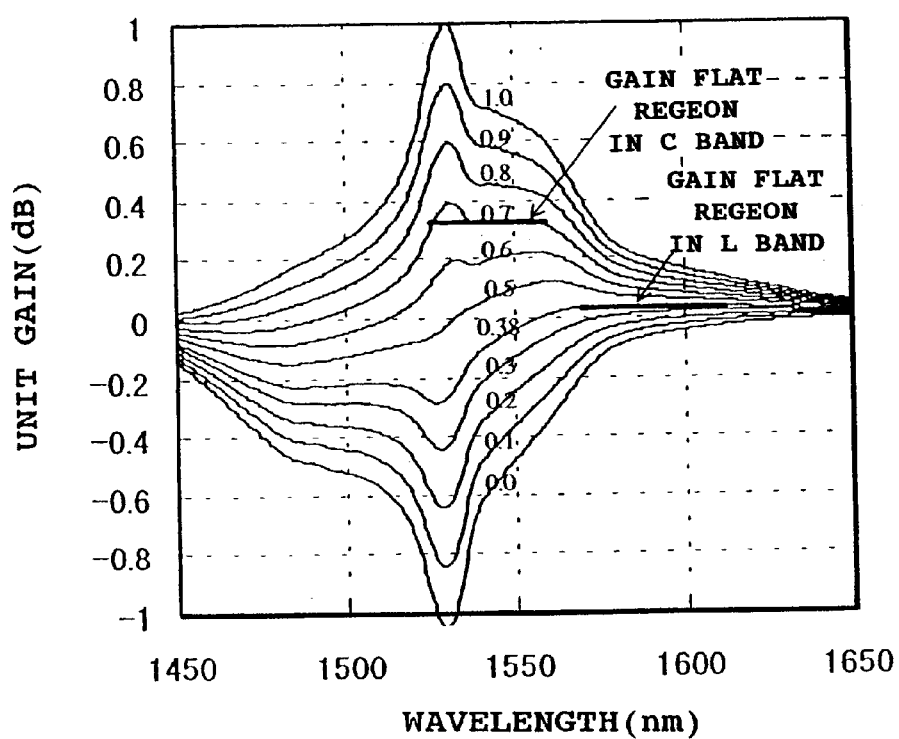
FIG. 6 is a graph showing changes in wavelength characteristic of gain of an EDFA with a population inversion ratio (or a population inversion factor) used as a parameter.

FIG. 6 is a graph showing changes in wavelength characteristic of gain of a typical EDFA with a population inversion ratio (or factor) used as a parameter. In FIG. 6, the vertical axis represents unit gain (dB), and the horizontal axis represents wavelength (nm). A gain flat region in the C band appears near a population inversion ratio of 0.7, and has a bandwidth of about 30 nm including a wavelength of 1.53 μm giving a gain peak. On the other hand, a gain flat region in the L band appears near a population inversion ratio of 0.38, and has a bandwidth greater than 30 nm. The unit gain in the L band is about ⅛ of the unit gain in the C band. Accordingly, it is necessary to increase the length of an EDF in an EDFA for the L band.

TABLE 1

| Quantity | C band | L band |
|---|---|---|
| Amplification region | 1525–1565 nm (40 nm) | 1570–1610 nm (40 nm) |
| 1-dB gain flat region | 1542–1558 nm (16 nm) | 1570–1600 nm (30 nm) |
| Noise figure | 4.1 dB or less | 4.8 dB or less |
| EDF length | 30 m or less | 150 m or less |

Figure 7:
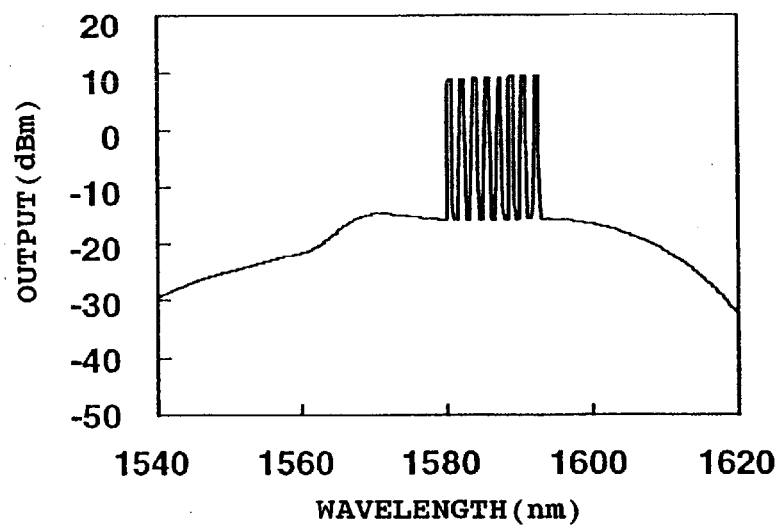
FIG. 7 is a graph showing an example of an optical spectrum in the L band.

Table 1 shows typical characteristics of EDFAs for the C band and the L band, and FIG. 7 shows an example of an optical spectrum in the L band. In Table 1, the amplification region is a region where gain is generated; the 1-dB gain flat region is a region where a gain deviation is 1 dB; the noise figure is a noise figure in the case of using pump light having a 1.48 μm band; and the EDF length is an EDF length for obtaining a gain of 30 dB. In FIG. 7, the vertical axis represents output (dBm) from the EDFA, and the horizontal axis represents wavelength (nm).

Figure 8:
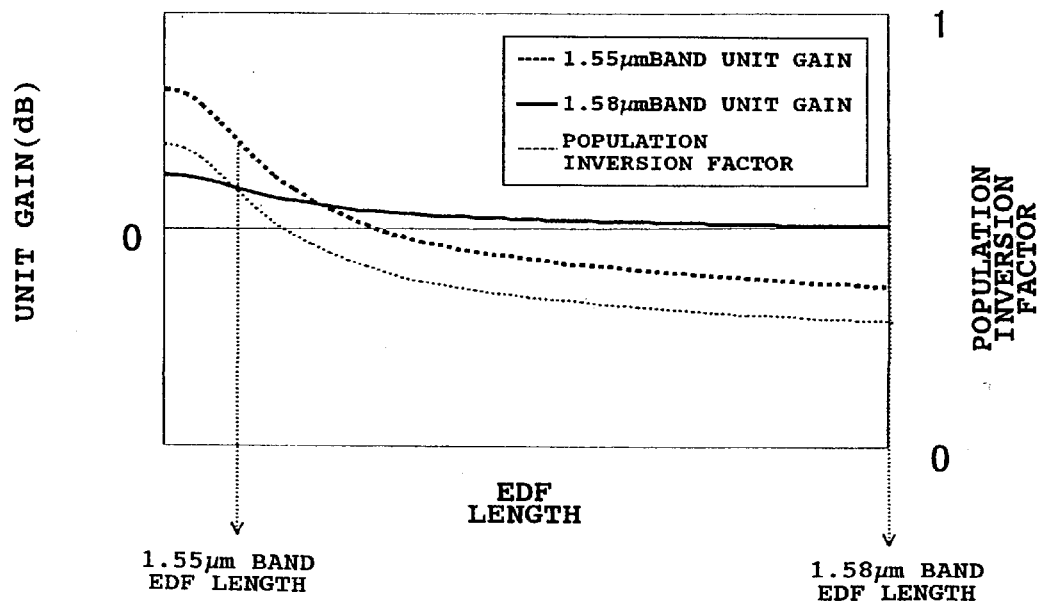
FIG. 8 is a graph for comparison in longitudinal distribution of a unit gain in an EDFA between the C band and the L band.

FIG. 8 is a graph for comparison in longitudinal distribution of the unit gain in an EDFA between the C band and the L band. A longitudinal distribution of population inversion ratio (or factor) is additionally shown in FIG. 8. In FIG. 8, the vertical axes represent unit gain (dB) and population inversion ratio (dimensionless), and the horizontal axis represents EDF length or longitudinal position on the EDF. The C band provides a large gain in a front portion of the EDF near its input end, but has an absorption characteristic in a rear portion of the EDF. On the other hand, the L band provides a minute gain over the length of the EDF, and achieves an accumulated gain equal to the gain of the C band. The population inversion ratio is high in the front portion of the EDF near its input end, and is reduced in the rear portion of the EDF down to a value providing a flat gain of the L band. Accordingly, the optimum length of the EDF for the C band is a small length where the C band has a gain, whereas the optimum length of the EDF for the L band is a large length required to obtain a given gain.

The superiority of the noise characteristic and gain efficiency in the C band over the noise characteristic and gain efficiency in the L band will now be described. In the amplification in the C band, the gain per unit EDF length is large, so that a structural loss by the EDF has a relatively small influence. To the contrary, in the case that the unit gain is low and a long EDF is necessary as in the L band, the influence of the structural loss becomes large. When the influence of the structural loss becomes dominant, the population inversion ratio near the input end of the EDF becomes low, and the noise figure over the EDF appears to be large. This may be explained in the following manner.

Referring to FIG. 8, the population inversion ratio near the input end of the EDF is high, so that the unit gain for signal light is high and the total gain for signal light may be calculated as the integral of unit gains over the length of the EDF. On the other hand, ASE (amplified spontaneous emission) is generated in the EDF, and is stimulatedly amplified gradually from a point spaced about ⅛ of the entire length of the EDF from the front end thereof, for example. In the case that the structural loss is large, the ratio of the gain in the rear portion to the total gain is increased by an amount corresponding to a decrease in the unit gain in the front portion. The total gain for signal light is calculated as the integral of unit gains over the length of the EDF. In contrast, the unit gain in the front portion does not so contribute to ASE, so that ASE increases relative to signal light. That is, there appears a tendency to degrade the noise figure. Accordingly, since a long EDF is necessary for the L band, the structural loss by the EDF affects the amplification to cause a degradation in noise figure or a degradation in gain efficiency.

Figure 9:
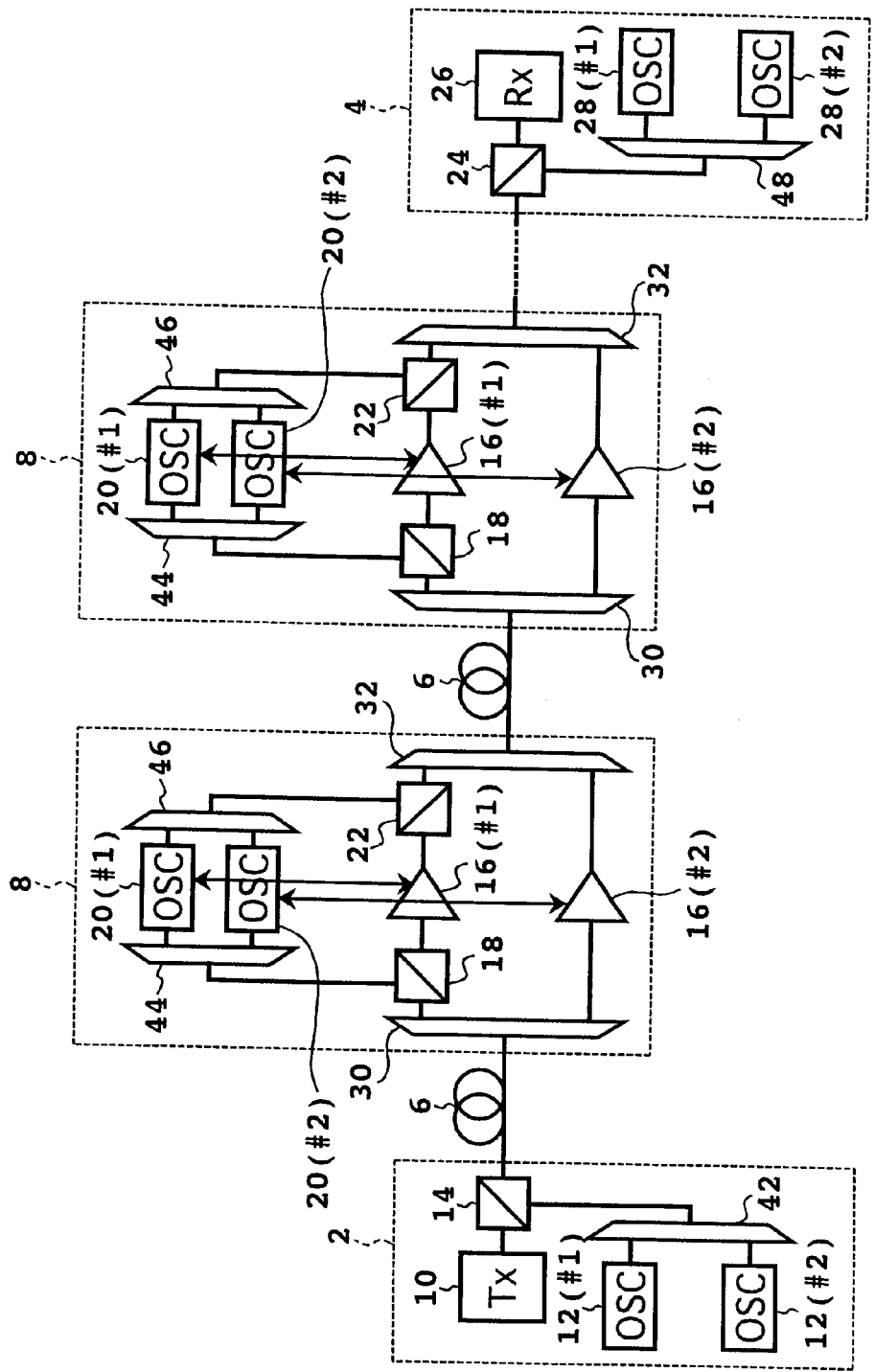
FIG. 9 is a block diagram showing a second preferred embodiment of the system according to the present invention.

FIG. 9 is a block diagram showing a second preferred embodiment of the system according to the present invention for transmitting a supervisory optical signal. In this preferred embodiment, supervisory optical signals of two channels are used to increase the amount of information transmittable by a supervisory signal. To this end, the first terminal device 2 includes an optical supervisory circuit 12(#1) for outputting a first supervisory optical signal having a wavelength $\lambda_{osc1}$ and an optical supervisory circuit 12(#2) for outputting a second supervisory optical signal having a wavelength $\lambda_{osc2}$ ($\neq \lambda_{osc1}$). The first and second supervisory optical signals are wavelength division multiplexed by an optical multiplexer 42. These multiplexed supervisory optical signals and main signal light output from an optical transmitter 10 are further multiplexed by a wavelength coupler 14. Each of the wavelengths $\lambda_{osc1}$ and $\lambda_{osc2}$ is set shorter than the wavelengths included in the C band for a reason similar to that in the preferred embodiment shown in FIG. 4. Preferably, the wavelengths $\lambda_{osc1}$ and $\lambda_{osc2}$ are included in a 1.51 μm band.

Each optical repeater 8 has two optical supervisory circuits 20(#1) and 20(#2) respectively adapted to the first and second supervisory optical signals. The first and second supervisory optical signals are separated from the C-band main signal light by a wavelength coupler 18, and then supplied to an optical demultiplexer 44, in which the first and second supervisory optical signals are separated from each other. The first and second supervisory optical signals from the optical demultiplexer 44 are supplied to the optical supervisory circuits 20(#1) and 20(#2), respectively. The optical supervisory circuits 20(#1) and 20(#2) perform supervisory control of an optical amplifier 16(#1) and/or an optical amplifier 16(#2), and then update the first and second supervisory optical signals. The updated first and second supervisory optical signals respectively output from the optical supervisory circuits 20(#1) and 20(#2) are wavelength division multiplexed by an optical multiplexer 46. These multiplexed supervisory optical signals and the C-band main signal light amplified by the optical amplifier 16(#1) are further multiplexed by a wavelength coupler 22.

The second terminal device 4 has two optical supervisory circuits 28(#1) and 28(#2) respectively adapted to the first and second supervisory optical signals. The first and second supervisory optical signals separated from the main signal light by a wavelength coupler 24 are supplied to an optical demultiplexer 48, in which the first and second supervisory optical signals are separated from each other. The first supervisory optical signal from the optical demultiplexer 48 is supplied to the optical supervisory circuit 28(#1), and the second supervisory optical signal from the optical demultiplexer 48 is supplied to the optical supervisory circuit 28(#2).

In the preferred embodiment shown in FIG. 4 or the preferred embodiment shown in FIG. 9, the two optical amplifiers 16(#1) and 16(#2) for bandwidth broadening are provided in each optical repeater 8. Accordingly, in contrast to the prior art shown in FIG. 1, the required amount of information by the supervisory signal in each optical repeater 8 will be increased. To cope with such an increase in the required amount of information, the bit rates of the optical supervisory circuits 12, 20, and 28 in the preferred embodiment shown in FIG. 4 must be increased, resulting in the necessity of changing the format of the supervisory optical signal with an increase in the number of bands. To the contrary, according to the preferred embodiment shown in FIG. 9, an increased number of optical supervisory circuits are provided in each of the terminal devices 2 and 4 and each optical repeater 8, so as to cope with the increase in the required amount of information, so that the format of the supervisory optical signal in each optical supervisory circuit can be maintained to easily respond to an increase in the number of bands.

Figure 10:
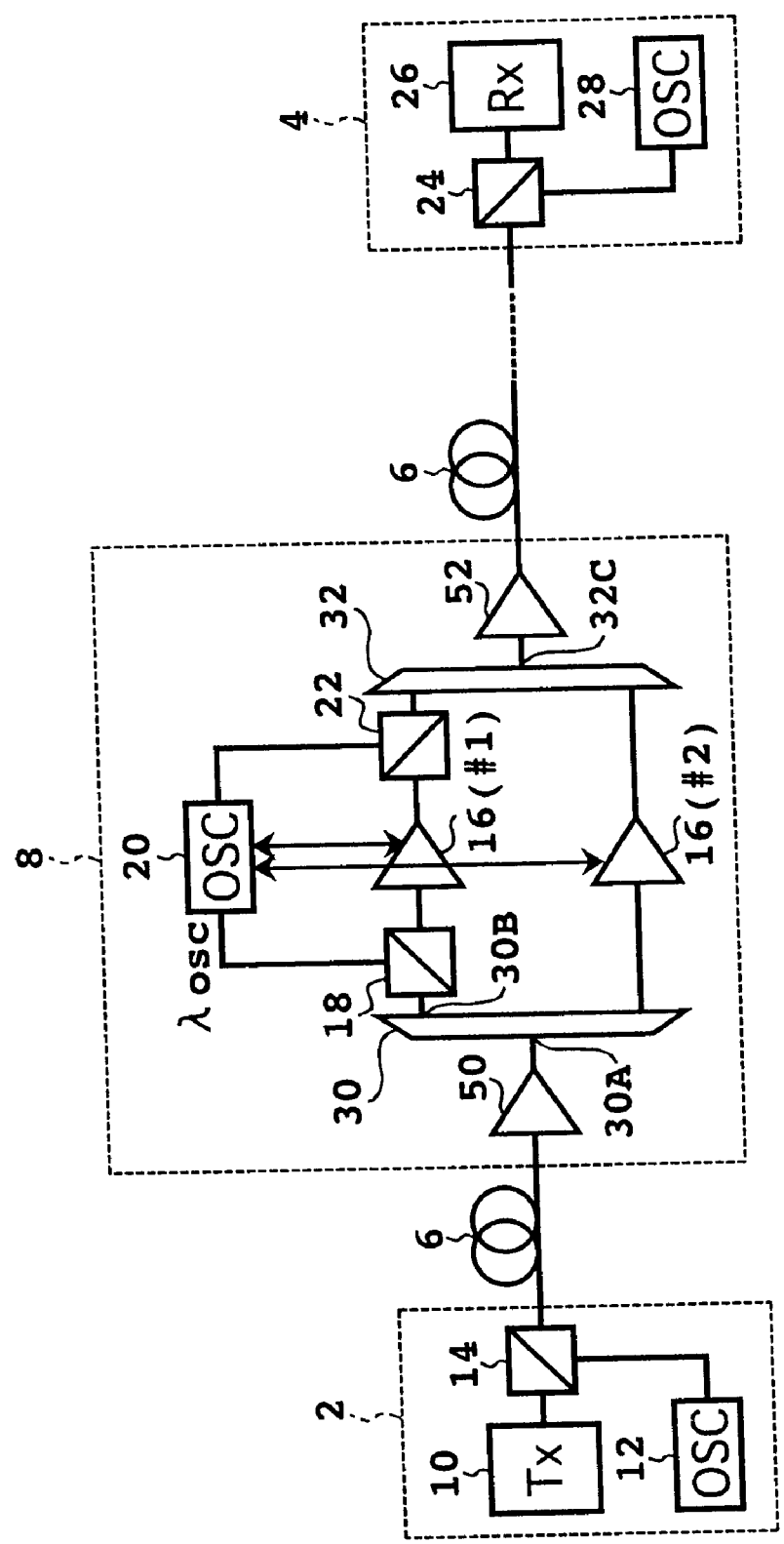
FIG. 10 is a block diagram showing a third preferred embodiment of the system according to the present invention.

FIG. 10 is a block diagram showing a third preferred embodiment of the system according to the present invention for transmitting a supervisory optical signal. In contrast to the first preferred embodiment shown in FIG. 4, the third preferred embodiment is characterized in that each optical repeater 8 further includes an optical amplifier 50 as a preamplifier and an optical amplifier 52 as a postamplifier. In FIG. 10, one optical repeater 8 is shown for simplicity of illustration.

The optical amplifier 50 is connected to the input port 30A of the optical demultiplexer 30, so as to amplify at least the C-band main signal light to be supplied to the optical repeater 8, and the optical amplifier 52 is connected to the output port 32C of the optical multiplexer 32, so as to amplify at least the C-band main signal light to be output from the optical repeater 8. For example, each of the optical amplifiers 50 and 52 has a characteristic of mainly amplifying the C-band main signal light, minutely amplifying the L-band main signal light, and passing the supervisory optical signal with a low loss or minutely amplifying the supervisory optical signal.

By adopting the optical amplifier 50, a reduction in noise figure due to insertion loss by the optical demultiplexer 30 can be prevented. By adopting the optical amplifier 52, a reduction in output level due to insertion loss by the optical multiplexer 32 can be compensated.

Figure 11:
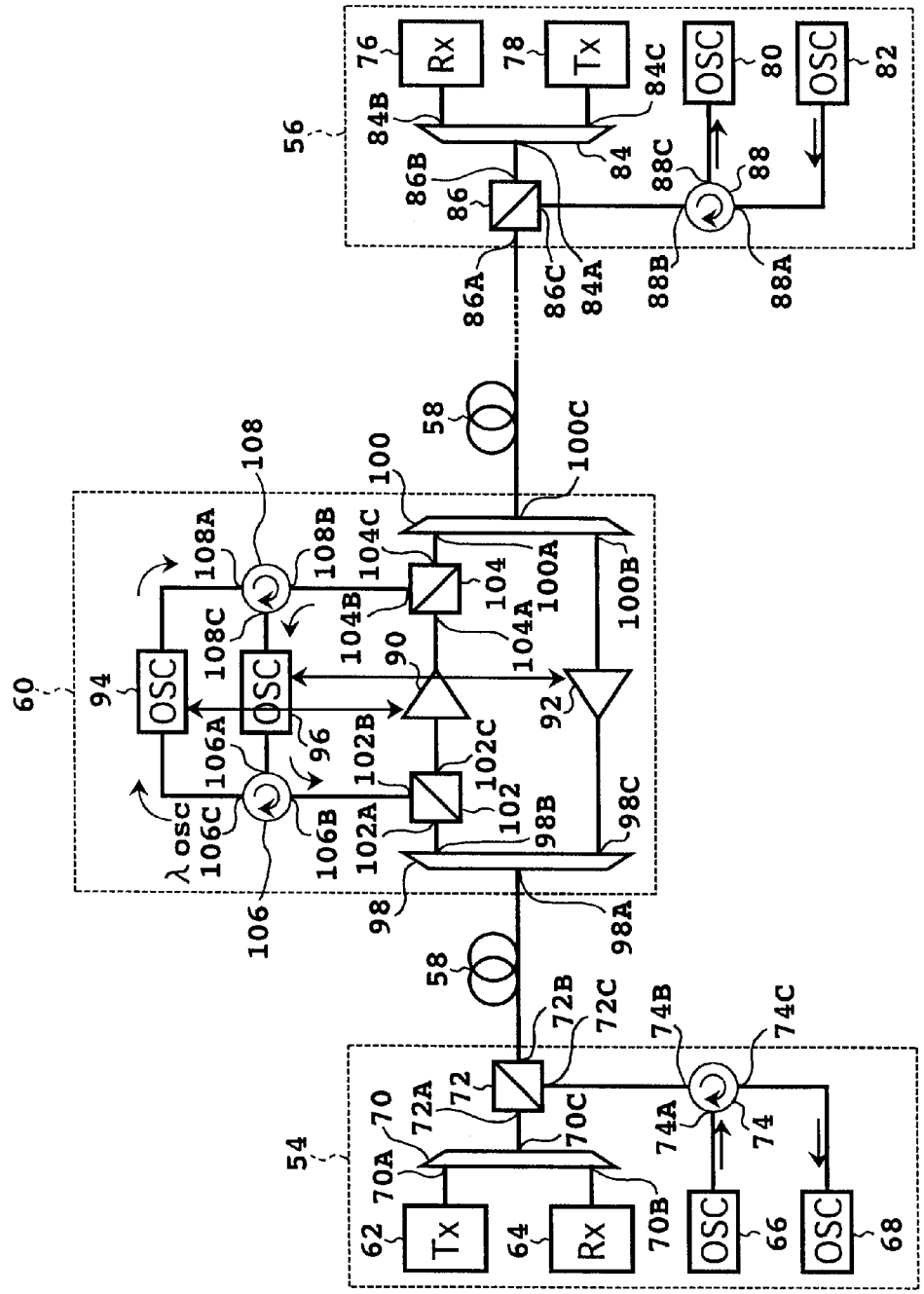
FIG. 11 is a block diagram showing a fourth preferred embodiment of the system according to the present invention.

FIG. 11 is a block diagram showing a fourth preferred embodiment of the system according to the present invention for transmitting a supervisory optical signal. This preferred embodiment is characterized in that bidirectional transmission is performed between terminal devices 54 and 56 each adapted to both transmission and reception. An optical fiber transmission line 58 is placed between the terminal devices 54 and 56. At least one optical repeater 60 is arranged along the optical fiber transmission line 58. While one optical repeater 60 is shown in FIG. 11, a plurality of optical repeaters 60 may be provided.

The terminal device 54 includes an optical transmitter 62 for outputting a single optical signal having a wavelength included in the C band or WDM signal light obtained by wavelength division multiplexing a plurality of optical signals having different wavelengths included in the C band as first main signal light, an optical receiver 64 for receiving a single optical signal having a wavelength included in the L band or WDM signal light obtained by wavelength division multiplexing a plurality of optical signals having different wavelengths included in the L band as second main signal light, an optical supervisory circuit 66 for outputting a first supervisory optical signal, and an optical supervisory circuit 68 for receiving a second supervisory optical signal. The terminal device 54 further includes an optical multi/demultiplexer 70, a wavelength coupler 72, and an optical circulator 74.

The optical multi/demultiplexer 70 has ports 70A, 70B, and 70C. The ports 70A and 70C are coupled by the C band, and the ports 70B and 70C are coupled by the L band. The port 70A is connected to the optical transmitter 62, and the port 70B is connected to the optical receiver 64.

The wavelength coupler 72 has ports 72A, 72B, and 72C. The ports 72A and 72B are coupled by the C band and the L band, and the ports 72B and 72C are coupled by the wavelengths of the first and second supervisory optical signals. The port 72A is connected to the port 70C of the optical multi/demultiplexer 70.

The optical circulator 74 has ports 74A, 74B, and 74C, and functions to output light supplied to the port 74A from the port 74B and output light supplied to the port 74B from the port 74C. The port 74A is connected to the optical supervisory circuit 66. The port 74B is connected to the port 72C of the wavelength coupler 72. The port 74C is connected to the optical supervisory circuit 68. The port 72B of the wavelength coupler 72 is connected to the optical fiber transmission line 58.

The terminal device 56 includes an optical receiver 76 for receiving the first main signal light in the C band, an optical transmitter 78 for outputting the second main signal light in the L band, an optical supervisory circuit 80 for receiving the first supervisory optical signal, and an optical supervisory circuit 82 for outputting the second supervisory optical signal. The terminal device 56 further includes an optical multi/demultiplexer 84, a wavelength coupler 86, and an optical circulator 88.

The optical multi/demultiplexer 84 has ports 84A, 84B, and 84C. The ports 84A and 84B are coupled by the C band, and the ports 84A and 84C are coupled by the L band.

The wavelength coupler 86 has ports 86A, 86B, and 86C. The ports 86A and 86B are coupled by the C band and the L band, and the ports 86A and 86C are coupled by the wavelengths of the first and second supervisory optical signals. The port 86A is connected to the optical fiber transmission line 58, and the port 86B is connected to the port 84A of the optical multi/demultiplexer 84. The ports 84B and 84C of the optical multi/demultiplexer 84 are connected to the optical receiver 76 and the optical transmitter 78, respectively.

The optical circulator 88 has ports 88A, 88B, and 88C, and functions to output light supplied to the port 88A from the port 88B and output light supplied to the port 88B from the port 88C. The port 88B is connected to the port 86C of the wavelength coupler 86. The port 88C is connected to the optical supervisory circuit 80. The port 88A is connected to the optical supervisory circuit 82.

Accordingly, the first main signal light and the first supervisory optical signal are transmitted from the terminal device 54 to the terminal device 56, whereas the second main signal light and the second supervisory optical signal are transmitted from the terminal device 56 to the terminal device 54.

Each optical repeater 60 includes a first optical amplifier 90 for amplifying the first main signal light, a second optical amplifier 92 for amplifying the second main signal light, and optical supervisory circuits 94 and 96 for processing the first and second supervisory optical signals, respectively. Optical multi/demultiplexers 98 and 100 are used to connect the optical amplifiers 90 and 92 in parallel. Wavelength couplers 102 and 104 and optical circulators 106 and 108 are used to connect the optical amplifier 90 and the optical supervisory circuits 94 and 96 in parallel.

The optical multi/demultiplexer 98 has ports 98A, 98B, and 98C. The ports 98A and 98B are coupled by the C band and the wavelengths of the first and second supervisory optical signals, and the ports 98A and 98C are coupled by the L band. The port 98A is connected to the optical fiber transmission line 58. The port 98C is connected to the output port of the optical amplifier 92.

The optical multi/demultiplexer 100 has ports 100A, 100B, and 100C. The ports 10A and 100C are coupled by the C band and the wavelengths of the first and second supervisory optical signals, and the ports 100B and 100C are coupled by the L band. The port 100B is connected to the input port of the optical amplifier 92, and the port 100C is connected to the optical fiber transmission line 58.

The wavelength coupler 102 has ports 102A, 102B, and 102C. The ports 102A and 102B are coupled by the wavelengths of the first and second supervisory optical signals, and the ports 102A and 102C are coupled by the C band. The port 102A is connected to the port 98B of the optical multi/demultiplexer 98, and the port 102C is connected to the input port of the optical amplifier 90. The wavelength coupler 104 has ports 104A, 104B, and 104C. The ports 104A and 104C are coupled by the C band, and the ports 104B and 104C are coupled by the wavelengths of the first and second supervisory optical signals. The port 104A is connected to the output port of the optical amplifier 90, and the port 104C is connected to the port 100A of the optical multi/demultiplexer 100.

The optical circulator 106 has ports 106A, 106B, and 106C, and functions to output light supplied to the port 106A from the port 106B and output light supplied to the port 106B from the port 106C. The port 106A is connected to the output port of the optical supervisory circuit 96. The port 106B is connected to the port 102B of the wavelength coupler 102. The port 106C is connected to the input port of the optical supervisory circuit 94.

The optical circulator 108 has ports 108A, 108B, and 108C, and functions to output light supplied to the port 108A from the port 108B and output light supplied to the port 108B from the port 108C. The port 108A is connected to the output port of the optical supervisory circuit 94. The port 108B is connected to the port 104B of the wavelength coupler 104. The port 108C is connected to the input port of the optical supervisory circuit 96.

With this configuration, the first main signal light propagating from the terminal device 54 to the terminal device 56 can be amplified by the optical amplifier 90; the second main signal light propagating from the terminal device 56 to the terminal device 54 can be amplified by the optical amplifier 92; the first supervisory optical signal propagating from the terminal device 54 to the terminal device 56 can be processed by the optical supervisory circuit 94; and the second supervisory optical signal propagating from the terminal device 56 to the terminal device 54 can be processed by the optical supervisory circuit 96.

The reason for parallel connection of the optical supervisory circuits 94 and 96 to the optical amplifier 90 for the C band in this preferred embodiment is that the optical amplifier 90 for the C band is superior in noise characteristic and gain efficiency to the optical amplifier 92 for the L band as in the previous preferred embodiments. That is, according to this preferred embodiment, the first and second supervisory optical signals can be transmitted without a large reduction in transmission quality of a main signal.

This preferred embodiment is not limited by the equality of the wavelengths of the first and second supervisory optical signals. That is, the wavelengths of the first and second supervisory optical signals may be equal to each other or may be different from each other. The wavelengths of the first and second supervisory optical signals are set shorter than the wavelengths included in the C band, and are preferably included in a 1.51 μm band.

Figure 12:
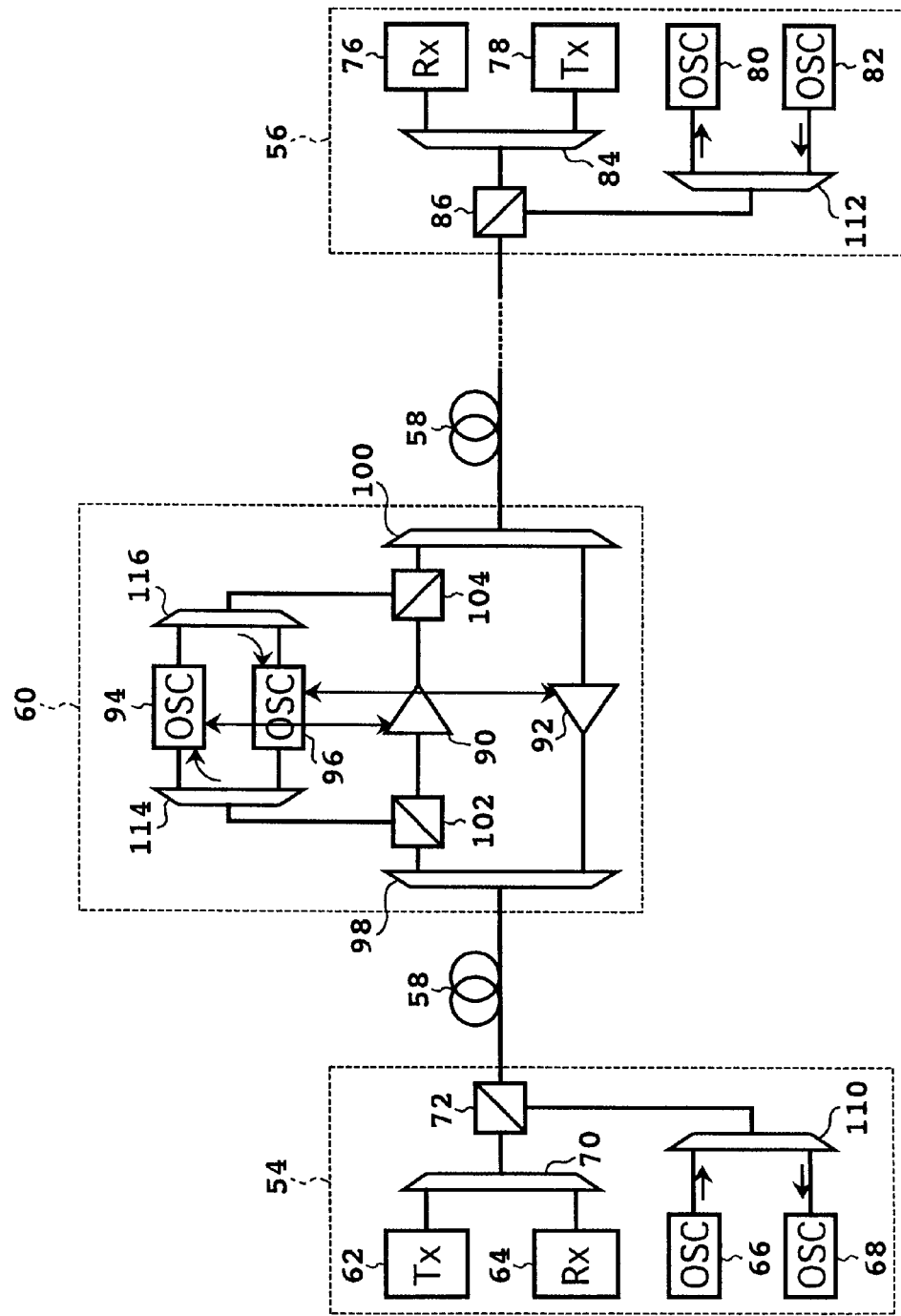
FIG. 12 is a block diagram showing a fifth preferred embodiment of the system according to the present invention.

FIG. 12 is a block diagram showing a fifth preferred embodiment of the system according to the present invention for transmitting a supervisory optical signal. In contrast to the preferred embodiment shown in FIG. 11, the fifth preferred embodiment is characterized in that the present invention is carried out limitedly by making the wavelengths of the first and second supervisory optical signals different from each other, thereby eliminating the need for relatively expensive optical circulators.

More specifically, an optical multi/demultiplexer 110 is used in place of the optical circulator 74 in the terminal device 54; an optical multi/demultiplexer 112 is used in place of the optical circulator 88 in the terminal device 56; and optical multi/demultiplexers 114 and 116 are used in place of the optical circulators 106 and 108 in each optical repeater 60, respectively.

The paths of propagation of the first and second main signal lights and the first and second supervisory optical signals in this preferred embodiment will be easily understood in conformity with the preferred embodiment shown in FIG. 11.

According to this preferred embodiment, it is possible to obtain the same effect as that obtained by the preferred embodiment shown in FIG. 11 and additionally obtain an effect that the cost for construction of the system can be reduced because of no need for optical circulators.

Figure 13:
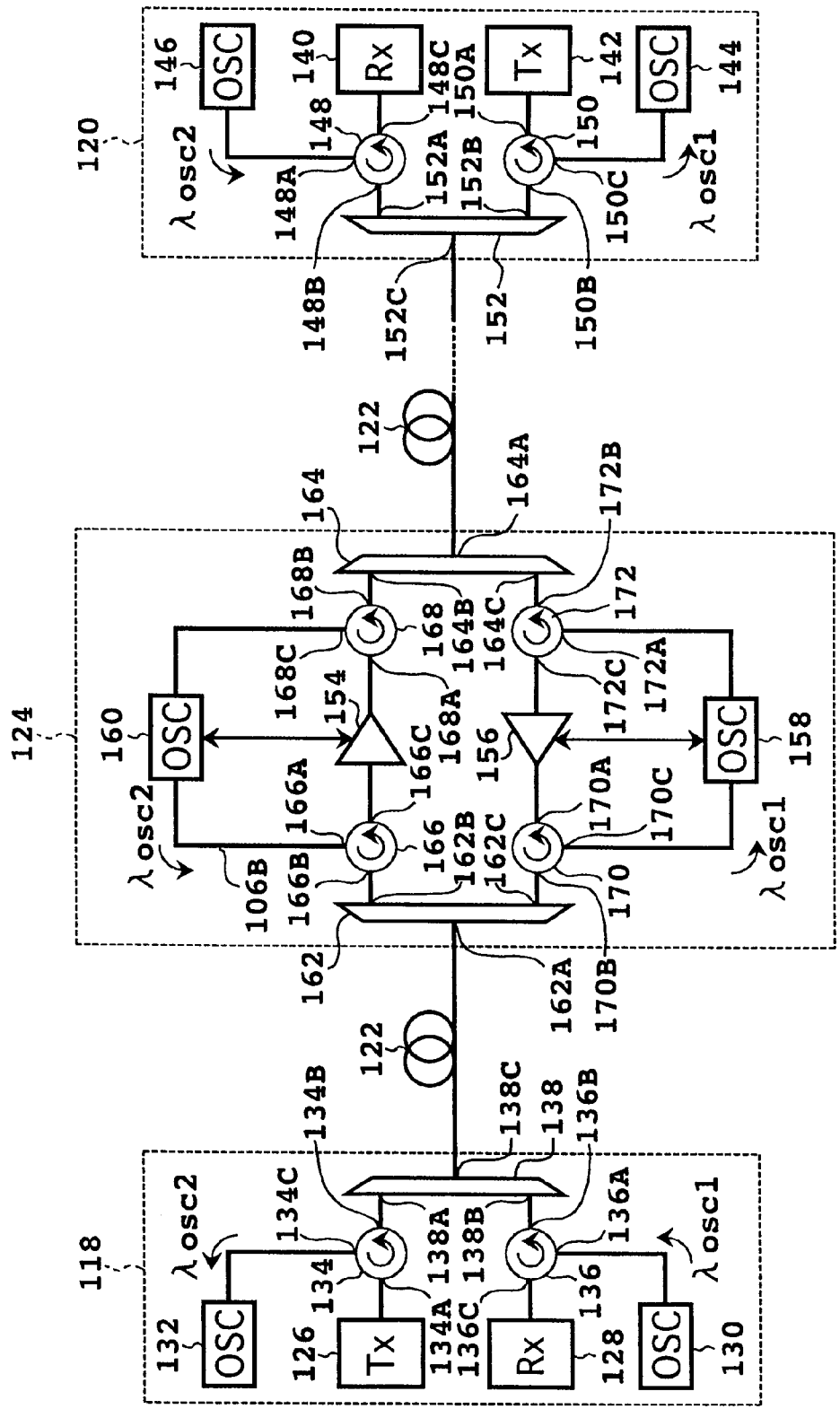
FIG. 13 is a block diagram showing a sixth preferred embodiment of the system according to the present invention.

FIG. 13 is a block diagram showing a sixth preferred embodiment of the system according to the present invention for transmitting a supervisory optical signal. Also in this preferred embodiment, bidirectional transmission is performed between terminal devices 118 and 120 each for transmission and reception. An optical fiber transmission line 122 is placed between the terminal devices 118 and 120, and at least one optical repeater 124 is arranged along the optical fiber transmission line 122. While one optical repeater 124 is shown in FIG. 13, a plurality of optical repeaters 124 may be used.

The terminal device 118 includes an optical transmitter 126 for outputting a single optical signal having a wavelength included in the C band or WDM signal light obtained by wavelength division multiplexing a plurality of optical signals having different wavelengths included in the C band as first main signal light, an optical receiver 128 for receiving a single optical signal having a wavelength included in the L band or WDM signal light obtained by wavelength division multiplexing a plurality of optical signals having different wavelengths included in the L band as second main signal light, an optical supervisory circuit 130 for outputting a first supervisory optical signal having a wavelength $\lambda_{osc1}$, and an optical supervisory circuit 132 for receiving a second supervisory optical signal having a wavelength $\lambda_{osc1}$ ($\neq \lambda_{osc1}$). The terminal device 118 further includes optical circulators 134 and 136 and an optical multi/demultiplexer 138.

The optical circulator 134 has ports 134A, 134B, and 134C, and functions to output light supplied to the port 134A from the port 134B and output light supplied to the port 134B from the port 134C. The port 134A is connected to the optical transmitter 126, and the port 134C is connected to the optical supervisory circuit 132.

The optical circulator 136 has ports 136A, 136B, and 136C, and functions to output light supplied to the port 136A from the port 136B and output light supplied to the port 136B from the port 136C. The port 136A is connected to the optical supervisory circuit 130, and the port 136C is connected to the optical receiver 128.

The optical multi/demultiplexer 138 has ports 138A, 138B, and 138C. The ports 138A and 138C are coupled by the C band and the wavelength $\lambda_{osc2}$, and the ports 138B and 138C are coupled by the L band and the wavelength $\lambda_{osc1}$. The port 138A is connected to the port 134B of the optical circulator 134. The port 138B is connected to the port 136B of the optical circulator 136. The port 138C is connected to the optical fiber transmission line 122.

The terminal device 120 includes an optical receiver 140 for receiving the first main signal light in the C band, an optical transmitter 142 for outputting the second main signal light in the L band, an optical supervisory circuit 144 for receiving the first supervisory optical signal, and an optical supervisory circuit 146 for outputting the second supervisory optical signal. The terminal device 120 further includes optical circulators 148 and 150 and an optical multi/demultiplexer 152.

The optical circulator 148 has ports 148A, 148B, and 148C, and functions to output light supplied to the port 148A from the port 148B and output light supplied to the port 148B from the port 148C. The port 148A is connected to the optical supervisory circuit 146, and the port 148C is connected to the optical receiver 140.

The optical circulator 150 has ports 150A, 150B, and 150C, and functions to output light supplied to the port 150A from the port 150B and output light supplied to the port 150B from the port 150C. The port 150A is connected to the optical transmitter 142, and the port 150C is connected to the optical supervisory circuit 144.

The optical multi/demultiplexer 152 has ports 152A, 152B, and 152C. The ports 152A and 152C are coupled by the C band and the wavelength $\lambda_{osc2}$, and the ports 152B and 152C are coupled by the L band and the wavelength $\lambda_{osc1}$.

Each optical repeater 124 includes an optical amplifier 154 for the C band, an optical amplifier 156 for the L band, an optical supervisory circuit 158 for processing the first supervisory optical signal, and an optical supervisory circuit 160 for processing the second supervisory optical signal. Optical multi/demultiplexers 162 and 164 are used to connect the optical amplifiers 154 and 156 in parallel. Optical circulators 166 and 168 are used to connect the optical amplifier 154 and the optical supervisory circuit 160 in parallel. Optical circulators 170 and 172 are used to connect the optical amplifier 156 and the optical supervisory circuit 158 in parallel.

The optical multi/demultiplexer 162 has ports 162A, 162B, and 162C. The ports 162A and 162B are coupled by the C band and the wavelength $\lambda_{osc2}$, and the ports 162A and 162C are coupled by the L band and the wavelength $\lambda_{osc1}$. The port 162A is connected to the optical fiber transmission line 122.

The optical multi/demultiplexer 164 has ports 164A, 164B, and 164C. The ports 164A and 164B are coupled by the C band and the wavelength $\lambda_{osc2}$, and the ports 164A and 164C are coupled by the L band and the wavelength $\lambda_{osc1}$. The port 164A is connected to the optical fiber transmission line 122.

The optical circulator 166 has ports 166A, 166B, and 166C, and functions to output light supplied to the port 166A from the port 166B and output light supplied to the port 166B from the port 166C. The port 166A is connected to the output port of the optical supervisory circuit 160. The port 166B is connected to the port 162B of the optical multi/demultiplexer 162. The port 166C is connected to the input port of the optical amplifier 154.

The optical circulator 168 has ports 168A, 168B, and 168C, and functions to output light supplied to the port 168A from the port 168B and output light supplied to the port 168B from the port 168C. The port 168A is connected to the output port of the optical amplifier 154. The port 168B is connected to the port 164B of the optical multi/demultiplexer 164. The port 168C is connected to the input port of the optical supervisory circuit 160.

The optical circulator 172 has ports 172A, 172B, and 172C, and functions to output light supplied to the port 172A from the port 172B and output light supplied to the port 172B from the port 172C. The port 172A is connected to the output port of the optical supervisory circuit 158. The port 172B is connected to the port 164C of the optical multi/demultiplexer 164. The port 172C is connected to the input port of the optical amplifier 156.

The optical circulator 170 has ports 170A, 170B, and 170C, and functions to output light supplied to the port 170A from the port 170B and output light supplied to the port 170B from the port 170C. The port 170A is connected to the output port of the optical amplifier 156. The port 170B is connected to the port 162C of the optical multi/demultiplexer 162. The port 170C is connected to the input port of the optical supervisory circuit 158.

With this configuration, the first main signal light propagating from the terminal device 118 to the terminal device 120 can be amplified by the optical amplifier 154; the second main signal light propagating from the terminal device 120 to the terminal device 118 can be amplified by the optical amplifier 156; the first supervisory optical signal propagating from the terminal device 118 to the terminal device 120 can be processed by the optical supervisory circuit 158; and the second supervisory optical signal propagating from the terminal device 120 to the terminal device 118 can be processed by the optical supervisory circuit 160.

To effect such an operation with a simple configuration, the wavelength $\lambda_{osc1}$ of the first supervisory optical signal is preferably set within the L band or longer than the wavelengths included in the L band, and the wavelength $\lambda_{osc1}$ of the second supervisory optical signal is preferably set within the C band or shorter than the wavelengths included in the C band.

In this preferred embodiment, the optical amplifier 154 is interposed between the optical circulators 166 and 168, and the optical amplifier 156 is interposed between the optical circulators 170 and 172. Accordingly, it is unnecessary to use an optical isolator for preventing undesired oscillation in each of the optical amplifiers 154 and 156, thereby allowing cost reduction. Further, in contrast to the previous preferred embodiments, it is unnecessary to use a wavelength coupler for branching off a supervisory optical signal, thereby preventing a degradation in noise characteristic and gain efficiency due to a relatively large insertion loss by the wavelength coupler.

Figure 14:
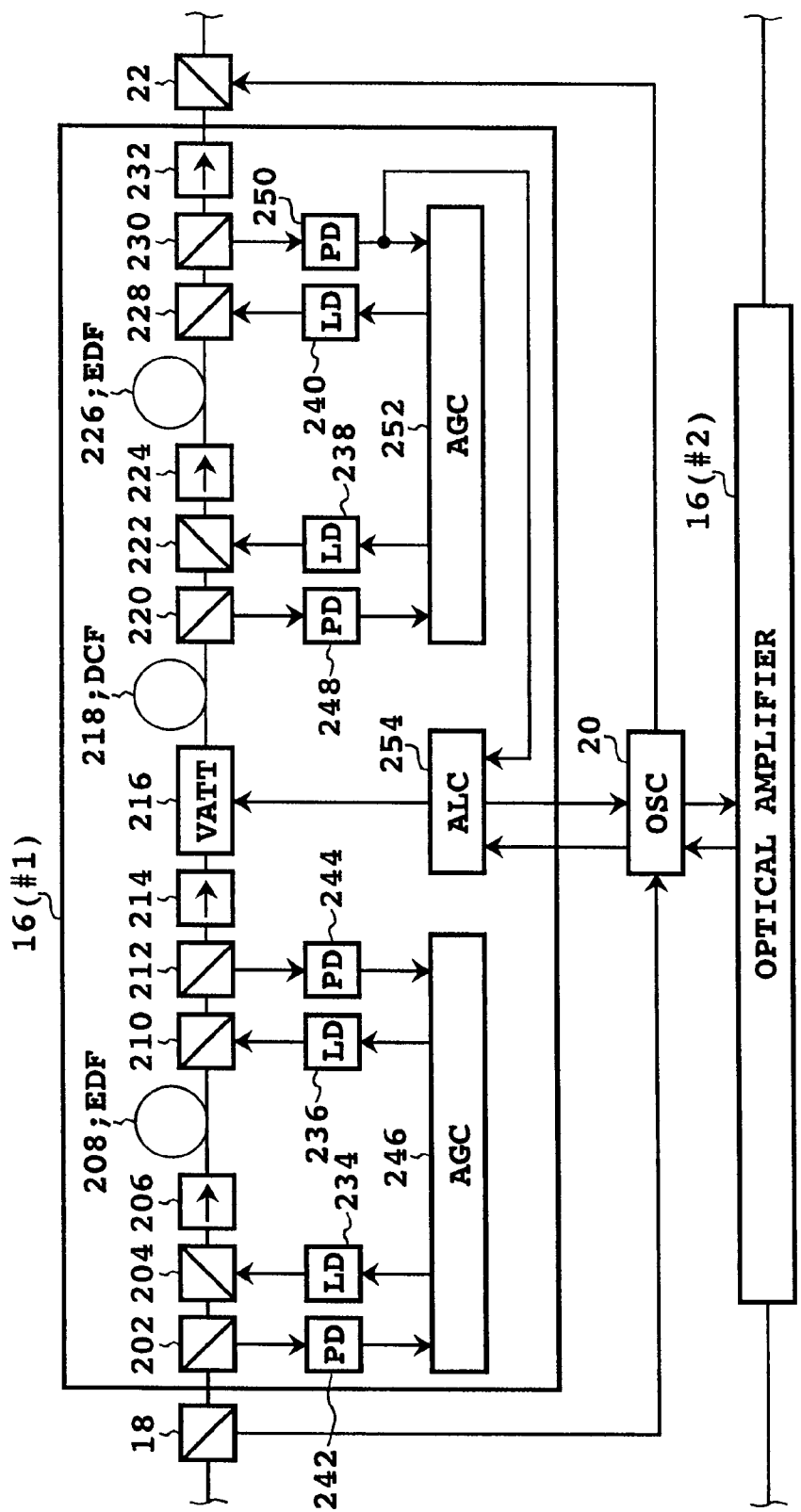
FIG. 14 is a block diagram showing a specific preferred embodiment of the EDFA shown in FIG. 5.

FIG. 14 is a block diagram showing a specific preferred embodiment of the EDFA shown in FIG. 5. More specifically, FIG. 14 shows a specific configuration of the optical amplifier 16(#1) in the system shown in FIG. 4.

The optical amplifier 16(#1) has an optical coupler 202, wavelength coupler 204, optical isolator 206, EDF (erbium doped fiber) 208, wavelength coupler 210, optical coupler 212, optical isolator 214, variable attenuator (VATT) 216, DCF (dispersion compensating fiber) 218, optical coupler 220, wavelength coupler 222, optical isolator 224, EDF 226, wavelength coupler 228, optical coupler 230, and optical isolator 232 cascaded between the wavelength couplers 18 and 22.

A laser diode (LD) 234 is used to forward pump the EDF 208, and an LD 236 is used to backward pump the EDF 208. Further, an LD 238 is used to forward pump the EDF 226, and an LD 240 is used to backward pump the EDF 226. The oscillation wavelength of each of the LDs 234, 236, 238, and 240 is set within a 0.98 $\mu$m band or a 1.48 $\mu$m band, for example.

Pump light output from the LD 234 is supplied through the wavelength coupler 204 and the optical isolator 206 into the EDF 208 from its front end, and pump light output from the LD 236 is supplied through the wavelength coupler 210 into the EDF 208 from its rear end.

Main signal light in the c band to be amplified is supplied through the wavelength coupler 18, the optical coupler 202, the wavelength coupler 204, and the optical isolator 206 into the EDF 208 from its front end. When the main signal light is supplied to the EDF 208 being pumped by the LDs 234 and 236, the main signal light is amplified during propagation in the EDF 208, and the main signal light thus amplified is supplied through the wavelength coupler 210, the optical coupler 212, and the optical isolator 214 to the variable attenuator 216.

In the optical coupler 202, monitor light for detection of an input power to the EDF 208 is branched from the main signal light to be amplified by the EDF 208. The monitor light from the optical coupler 202 is converted into an electrical signal having a level corresponding to the power of the monitor light by a photodetector (PD) 242. The electrical signal output from the PD 242 is supplied to an AGC (automatic gain control) circuit 246. In the optical coupler 212, monitor light for detection of an output power from the EDF 208 is branched from the main signal light amplified by the EDF 208. The monitor light from the optical coupler 212 is converted into an electrical signal having a level corresponding to the power of the monitor light by a PD 244. The electrical signal output from the PD 244 is supplied to the AGC circuit 246. The AGC circuit 246 controls drive currents (bias currents) for the LDs 234 and 236 according to the output signals from the PDs 242 and 244 so that the gain generated in the EDF 208 becomes constant.

The main signal light supplied to the variable attenuator 216 undergoes controlled attenuation. The main signal light attenuated by the variable attenuator 216 is supplied to the DCF 218. The DCF 218 is used to compensate for chromatic dispersion generated in the optical fiber transmission line 6 (see FIG. 4, for example).

The main signal light passed through the DCF 218 is supplied through the optical coupler 220, the wavelength coupler 222, and the optical isolator 224 into the EDF 226 from its front end. Pump light output from the LD 238 is supplied through the wavelength coupler 222 and the optical isolator 224 into the EDF 226 from its front end, and pump light output from the LD 240 is supplied through the wavelength coupler 228 into the EDF 226 from its rear end.

When the main signal light is supplied to the EDF 226 being pumped by the LDs 238 and 240, the main signal light is amplified during propagation in the EDF 226. The main signal light amplified by the EDF 226 is passed through the wavelength coupler 228, the optical coupler 230, and the optical isolator 232, and is output from this optical amplifier 16(#1).

In the optical coupler 220, monitor light for detection of an input power to the EDF 226 is branched from the main signal light to be amplified by the EDF 226. The monitor light from the optical coupler 220 is converted into an electrical signal having a level corresponding to the power of the monitor light by a PD 248. The electrical signal output from the PD 248 is supplied to an AGC circuit 252. In the optical coupler 230, monitor light for detection of an output power from the EDF 226 is branched from the main signal light amplified by the EDF 226. The monitor light from the optical coupler 230 is converted into an electrical signal having a level corresponding to the power of the monitor light by a PD 250. The electrical signal output from the PD 250 is supplied to the AGC circuit 252 and an ALC (automatic output level control) circuit 254.

The AGC circuit 252 controls drive currents (bias currents) for the LDs 238 and 240 according to the output signals from the PDs 248 and 250 so that the gain generated in the EDF 226 becomes constant.

The ALC circuit 254 controls the attenuation in the variable attenuator 216 so that the power of the main signal light output from the EDF 226, that is, output from this optical amplifier 16(#1), becomes constant.

Particularly in the case that the main signal light to be amplified by the optical amplifier 16(#1) is WDM signal light, the ALC circuit 254 controls the attenuation in the variable attenuator 216 so that the power per channel of the amplified WDM signal light output from the optical amplifier 16(#1) becomes constant. In this case, the output signal from the PD 250 reflects the total power of all the channels of the amplified WDM signal light. Accordingly, to achieve such a function of the ALC circuit 254, a reference level for the control in the ALC circuit 254 must be changed according to the number of channels of the WDM signal light. For example, the ALC circuit 254 compares the voltage level of the output signal from the PD 250 with a present reference level to obtain an error signal, and controls the attenuation in the variable attenuator 216 so that the error signal becomes 0, thereby maintaining constant the power per channel of the amplified WDM signal light.

Information on the number of channels for setting the reference level is supplied from the optical supervisory circuit 20 to the ALC circuit 254, and a confirmation signal on this setting is supplied from the ALC circuit 254 to the optical supervisory circuit 20. Then, in the optical supervisory circuit 20, the supervisory optical signal is updated so as to include the confirmation signal.

The optical amplifier 16(#2) for the L band may be configured similarly to the optical amplifier 16(#1).

In this preferred embodiment, the gain generated in each of the EDFs 208 and 226 can be maintained constant. Accordingly, by properly setting the pumping condition for each of the EDFs 208 and 226, the wavelength characteristic of gain can be maintained flat. Even if the wavelength characteristic of gain is not maintained flat, the wavelength characteristic of gain can be maintained constant, so that by applying a gain equalizer (not shown) having a fixed wavelength characteristic of loss, the wavelength characteristic of gain can be maintained flat. The gain equalizer may be provided by a fiber grating, for example.

In this preferred embodiment, the ALC circuit 254 and the variable attenuator 216 function so that the power per channel of the amplified WDM signal light is maintained constant, for example. Accordingly, an input dynamic range can be increased. That is, even if the input power per channel of the WDM signal light to be amplified varies in an allowable range, the output power per channel can be maintained constant.

An example of changing of the number of operating channels will now be described with reference to FIGS. 4 and 14. Before changing the number of operating channels, information on changing of the number of current operating channels and on the number of operating channels after changed is supplied to the optical supervisory circuit 20 in each optical repeater 8 by means of the supervisory optical signal. Then, the optical supervisory circuit 20 operates to temporarily fix the attenuation in the variable attenuator 216. As a result, in the optical amplifier 16(#1), for example, an ALC mode is switched to an AGC mode. Thereafter, the value of the reference level to be used in the ALC circuit 254 is rewritten into a value corresponding to the number of channels after changed. Then, information that each optical repeater 8 is in a standby state is supplied from each optical repeater 8 to the terminal device 2 or 4 by means of the supervisory optical signal.

After confirming that all the optical repeaters 8 are in the standby state, the optical transmitter 10 in the terminal device 2 changes the number of channels. Thereafter, the terminal device 2 supplies information on cancellation of the standby state to each optical repeater 8 by means of the supervisory optical signal.

In each optical repeater 8 having received the instruction of cancellation of the standby state, the AGC mode is returned to the ALC mode. That is, the attenuation in the variable attenuator 216 is returned from a fixed value to a controlled value. Then, information on such return from the AGC mode to the ALC mode is supplied from each optical repeater 8 to the terminal device 2 or 4 by means of the supervisory optical signal.

According to the above operation, there occurs a slight change in the apparent operation of each optical amplifier in switching between the ALC mode and the AGC mode, so that an undesired operation as causing trouble to the existing channels can be prevented.

While the configuration and its related operation of the optical amplifier 16(#1) shown in FIG. 4 have been described, the configuration and its related operation of the optical amplifier shown in FIG. 14 are applicable to the other systems according to the present invention.

It should be noted that the above preferred embodiments of the present invention are merely illustrative and not limitative. For example, the present invention is not limited to processing of the supervisory optical signal in relation to an optical amplifier superior both in noise characteristic and in gain efficiency, but may be applied to processing of the supervisory optical signal in relation to an optical amplifier superior either in noise characteristic or in gain efficiency.

Further, while multiplexing of the two bands, or the C band and the L band for the purpose of bandwidth broadening has been described, three or more bands may be multiplexed. In this case, the supervisory optical signal is processed in relation to an optical amplifier applied to any band where at least one of the noise characteristic and the gain efficiency is the best. In the case that there are a plurality of bands where at least one of the noise characteristic and the gain efficiency is the best, the processing of the supervisory optical signal may be distributed in relation to a plurality of optical amplifiers applied to these plural bands.

Figure 15:
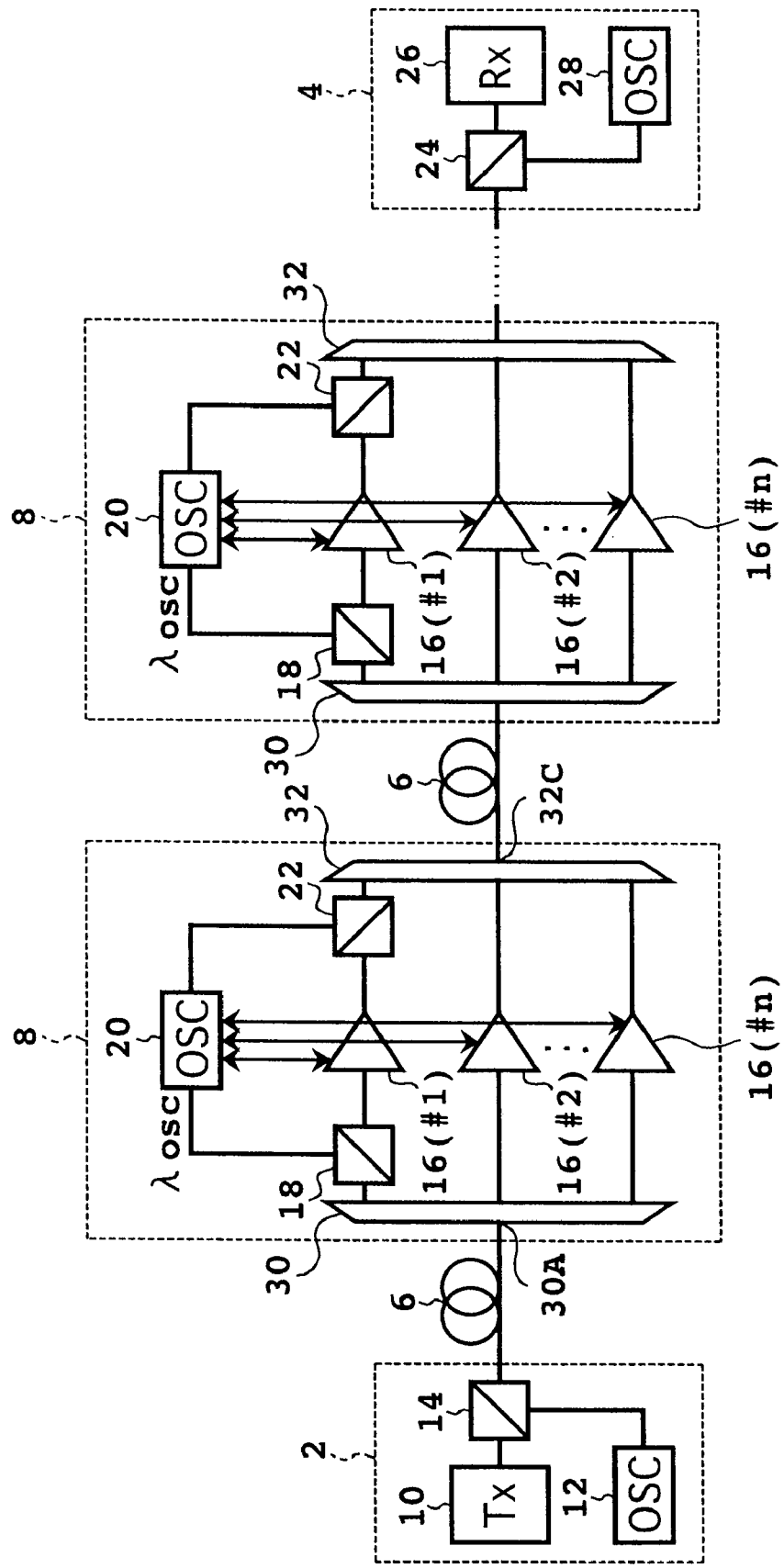
FIG. 15 is a block diagram showing a seventh preferred embodiment of the system according to the present invention.

FIG. 15 is a block diagram showing a seventh preferred embodiment of the system according to the present invention for transmitting a supervisory optical signal. In contrast to the first preferred embodiment shown in FIG. 4, the seventh preferred embodiment is characterized in that each optical repeater 8 includes three or more optical amplifiers 16(#1 to #n). The supervisory optical signal is processed in relation to the optical amplifier 16(#1) applied to any band where at least one of the noise characteristic and the gain efficiency is the best.

Figure 16:
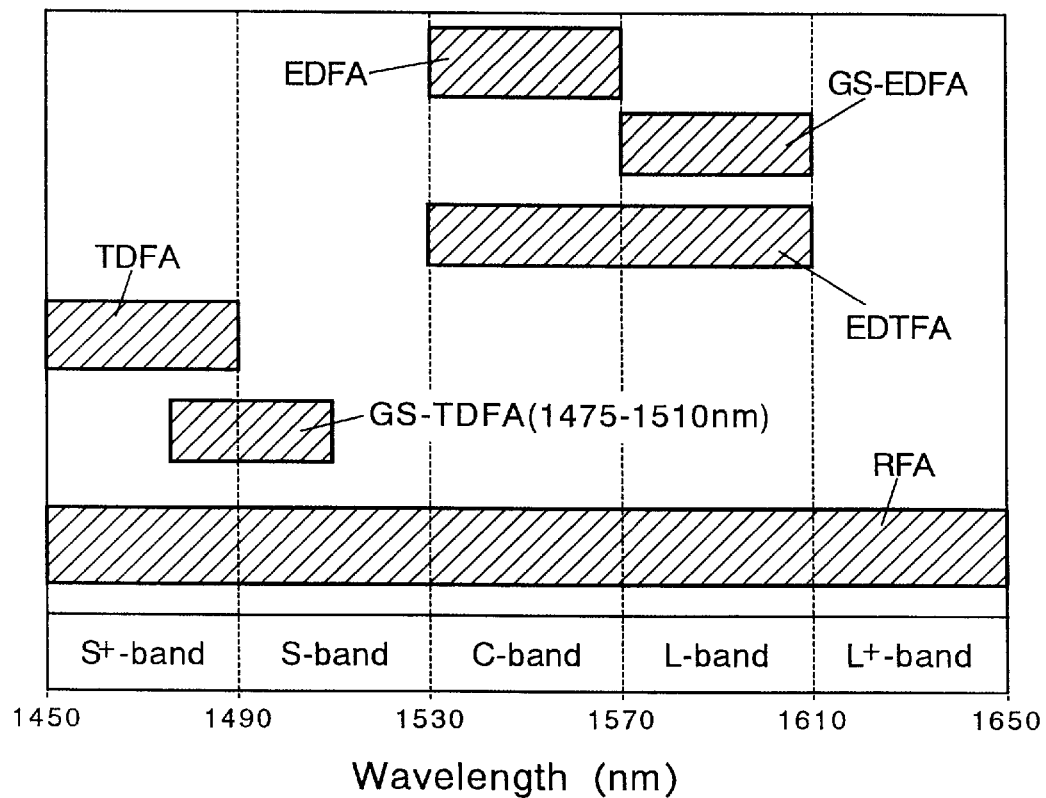
FIG. 16 is a chart showing broadband optical amplifiers applicable to the present invention.

FIG. 16 is a chart showing broadband optical amplifiers applicable to the present invention. Although not shown, an optical amplifier for 1.3 $\mu$m may be applied to the present invention. The optical amplifier for 1.3 $\mu$m comprises an optical amplifying medium including Pr (praseodymium) and a pumping source pumping the optical amplifying medium. The pumping source may be a light source emitting light of 1.0 $\mu$m band.

The broadband optical amplifier shown in FIG.16 may be used as each of the optical amplifiers 16(#1 to #n) shown in FIG.15.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method for transmitting a supervisory optical signal, comprising the steps of:
   (a) providing a first optical amplifier for a first band determining a noise characteristic and a gain efficiency;
   (b) providing a second optical amplifier for a second band determining a noise characteristic and a gain efficiency; and
   (c) processing said supervisory optical signal in relation to one of said first and second optical amplifiers superior in at least one of said noise characteristic and said gain efficiency to the other.

2. A method according to claim 1, wherein each of said first and second optical amplifiers comprises a doped fiber doped with a rare earth element, and a pumping source for supplying pump light to said doped fiber.

3. A method according to claim 1, wherein each of said first and second optical amplifiers comprises a doped fiber doped with Er (erbium), and a pumping source for supplying pump light to said doped fiber.

4. A method according to claim 3, wherein:
   said doped fiber of said second optical amplifier has a length longer than that of said doped fiber of said first optical amplifier;
   said supervisory optical signal being processed in relation to said first optical amplifier.

5. A method according to claim 1, wherein:
   said first band includes a C band defined by the range of 1.53 to 1.56 $\mu$m; and
   said second band includes an L band defined by the range of 1.57 to 1.60 $\mu$m;
   said supervisory optical signal being processed in relation to said first optical amplifier.

6. A method according to claim 5, wherein said supervisory optical signal has a wavelength shorter than the wavelengths included in said C band.

7. A method according to claim 1, further comprising the steps of:
   inputting main signal light having a wavelength included in said first band into said first optical amplifier; and
   inputting main signal light having a wavelength included in said second band into said second optical amplifier.

8. A method according to claim 7, wherein said step (c) comprises the step of wavelength separating said supervisory optical signal from said main signal light to be input into one of said first and second optical amplifiers.

9. A method according to claim 1, wherein said step (c) comprises the step of performing supervisory control of at least one of said first and second optical amplifiers according to said supervisory optical signal.

10. A device for transmitting a supervisory optical signal, comprising:
    an optical demultiplexer having an input port and first and second output ports, said input port and said first output port being coupled by a first band, said input port and said second output port being coupled by a second band;
    an optical multiplexer having first and second input ports and an output port, said first input port and said output port being coupled by said first band, said second input port and said output port being coupled by said second band;
    a first optical amplifier provided between said first output port and said first input port for performing amplification in said first band;
    a second optical amplifier provided between said second output port and said second input port for performing amplification in said second band;
    a first wavelength coupler provided between said first output port and said first optical amplifier for branching off said supervisory optical signal output from said first output port;
    a supervisory circuit for receiving said supervisory optical signal from said first wavelength coupler; and
    a second wavelength coupler provided between said first optical amplifier and said first input port for supplying said supervisory optical signal output from said supervisory circuit to said first input port;
    at least one of a noise characteristic and a gain efficiency of said first optical amplifier being superior to that of said second optical amplifier.

11. A device according to claim 10, wherein said supervisory circuit comprises a plurality of supervisory circuits.

12. A device according to claim 10, further comprising a third optical amplifier connected to said input port of said optical demultiplexer.

13. A device according to claim 10, further comprising a third optical amplifier connected to said output port of said optical multiplexer.

14. A device according to claim 10, wherein each of said first and second optical amplifiers comprises a doped fiber doped with a rare earth element, and a pumping source for supplying pump light to said doped fiber.

15. A device according to claim 10, wherein each of said first and second optical amplifiers comprises a doped fiber doped with Er (erbium), and a pumping source for supplying pump light to said doped fiber.

16. A device according to claim 15, wherein said doped fiber of said second optical amplifier has a length longer than that of said doped fiber of said first optical amplifier.

17. A device according to claim 10, wherein:

said first band includes a C band defined by the range of 1.53 to 1.56 µm; and said second band includes an L band defined by the range of 1.57 to 1.60 µm.

18. A device according to claim 17, wherein said supervisory optical signal has a wavelength shorter than the wavelengths included in said C band.

19. A system for transmitting a supervisory optical signal, comprising:

an optical fiber transmission line for transmitting said supervisory optical signal and main signal light obtained by wavelength division multiplexing an optical signal having a wavelength included in a first band and an optical signal having a wavelength included in a second band; and at least one optical repeater arranged along said optical fiber transmission line;

said optical repeater comprising:

a first optical amplifier for said first band;

a second optical amplifier for said second band; and a supervisory circuit provided in parallel to said first optical amplifier for processing said supervisory optical signal;

at least one of a noise characteristic and a gain efficiency of said first optical amplifier being superior to that of said second optical amplifier.

20. A system according to claim 19, wherein said optical repeater further comprises:

an optical demultiplexer and an optical multiplexer for connecting said first and second optical amplifiers in parallel; and first and second wavelength couplers for connecting said first optical amplifier and said supervisory circuit in parallel.

21. A system according to claim 19, further comprising a terminal device connected to said optical fiber transmission line;

said terminal device comprising:

an optical transmitter for outputting said main signal light;

a supervisory circuit for outputting said supervisory optical signal; and a wavelength coupler for multiplexing said main signal light and said supervisory optical signal to supply them to said optical fiber transmission line.

22. A system according to claim 19, further comprising a terminal device connected to said optical fiber transmission line;

said terminal device comprising:

a wavelength coupler for demultiplexing said main signal light and said supervisory optical signal transmitted by said optical fiber transmission line;

an optical receiver for receiving said main signal light from said wavelength coupler; and a supervisory circuit for receiving said supervisory optical signal from said wavelength coupler.

23. A system according to claim 19, wherein each of said first and second optical amplifiers comprises a doped fiber doped with a rare earth element, and a pumping source for supplying pump light to said doped fiber.

24. A system according to claim 19, wherein each of said first and second optical amplifiers comprises a doped fiber doped with Er (erbium), and a pumping source for supplying pump light to said doped fiber.

25. A system according to claim 24, wherein said doped fiber of said second optical amplifier has a length longer than that of said doped fiber of said first optical amplifier.

26. A system according to claim 19, wherein:

said first band includes a C band defined by the range of 1.53 to 1.56 µm; and said second band includes an L band defined by the range of 1.57 to 1.60 µm.

27. A system according to claim 26, wherein said supervisory optical signal has a wavelength shorter than the wavelengths included in said C band.

28. A system for transmitting first and second supervisory optical signals, comprising:

an optical fiber transmission line for transmitting said first supervisory optical signal and first main signal light having a wavelength included in a first band in a first direction and transmitting said second supervisory optical signal and second main signal light having a wavelength included in a second band in a second direction opposite to said first direction; and at least one optical repeater arranged along said optical fiber transmission line;

said optical repeater comprising:

a first optical amplifier for amplifying said first main signal light;

a second optical amplifier for amplifying said second main signal light; and first and second supervisory circuits provided in parallel to said first optical amplifier for processing said first and second supervisory optical signals, respectively;

at least one of a noise characteristic and a gain efficiency of said first optical amplifier being superior to that of said second optical amplifier.

29. A system according to claim 28, wherein:

said optical repeater further comprises:

first and second optical multi/demultiplexers for connecting said first and second optical amplifiers in parallel; and first and second wavelength couplers for connecting said first optical amplifier and said first and second supervisory circuits in parallel.

30. A system according to claim 29, wherein:

said optical repeater further comprises first and second optical circulators respectively connected to said first and second wavelength couplers;

said first and second supervisory circuits being connected between said first and second optical circulators.

31. A system according to claim 29, wherein:

said first and second supervisory optical signals have different wavelengths; and said optical repeater further comprises third and fourth optical multi/demultiplexers respectively connected to said first and second wavelength couplers;

said first and second supervisory circuits being connected between said third and fourth optical multi/demultiplexers.

32. A system for transmitting first and second supervisory optical signals, comprising:

an optical fiber transmission line for transmitting said first supervisory optical signal and first main signal light having a wavelength included in a first band in a first direction and transmitting said second supervisory optical signal and second main signal light having a wavelength included in a second band in a second direction opposite to said first direction; and at least one optical repeater arranged along said optical fiber transmission line;

said optical repeater comprising:
- a first optical amplifier for amplifying said first main signal light;
- a second optical amplifier for amplifying said second main signal light;
- first and second supervisory circuits for processing said first and second supervisory optical signals, respectively;
- first and second optical circulators for connecting said first optical amplifier and said second supervisory circuit in parallel; and
- third and fourth optical circulators for connecting said second optical amplifier and said first supervisory circuit in parallel.

33. A device for transmitting a supervisory optical signal, comprising:

first and second optical circulators each having first, second, and third ports to output light supplied to said first port from said second port and output light supplied to said second port from said third port;

an optical amplifier connected between said third port of said first optical circulator and said first port of said second optical circulator; and a supervisory circuit connected between said first port of said first optical circulator and said third port of said second optical circulator.

34. A device according to claim 33, wherein:

main signal light is supplied to said second port of said first optical circulator; and said supervisory optical signal is supplied to said second port of said second optical circulator.

35. A method for transmitting a supervisory optical signal, comprising the steps of:

(a) providing a plurality of optical amplifiers each for a band determining a noise characteristic and a gain efficiency; and (b) processing said supervisory optical signal in relation to one or more of said plurality of optical amplifiers applied to any band where at least one of said noise characteristic and said gain efficiency is the best.

\* \* \* \* \*